(12) United States Patent
Kim et al.

(10) Patent No.: US 7,483,147 B2
(45) Date of Patent: Jan. 27, 2009

(54) APPARATUS AND METHOD FOR MEASURING THICKNESS AND PROFILE OF TRANSPARENT THIN FILM USING WHITE-LIGHT INTERFEROMETER

(75) Inventors: Seung Woo Kim, Daejeon (KR); Young Sik Ghim, Seoul (KR)

(73) Assignee: Korea Advanced Institute of Science and Technology (KAIST), Daejeon (KR)

( * ) Notice: Subject to any disclaimer, the term of this patent is extended or adjusted under 35 U.S.C. 154(b) by 399 days.

(21) Appl. No.: 11/270,433

(22) Filed: Nov. 9, 2005

(65) Prior Publication Data

US 2006/0098206 A1    May 11, 2006

(30) Foreign Application Priority Data

Nov. 10, 2004   (KR)  ............... 10-2004-0091655
Oct. 4, 2005    (KR)  ............... 10-2005-0092978

(51) Int. Cl.
  *G01B 11/02*    (2006.01)
(52) U.S. Cl. .................................. 356/497; 356/495
(58) Field of Classification Search ........... 356/497, 356/479, 492, 494, 495, 630–632
See application file for complete search history.

(56) References Cited

U.S. PATENT DOCUMENTS

| | | | |
|---|---|---|---|
| 6,943,968 B2* | 9/2005 | Nielson et al. | 359/822 |
| 7,050,173 B2* | 5/2006 | Wang et al. | 356/495 |
| 7,177,030 B2* | 2/2007 | Leizerson et al. | 356/504 |
| 2004/0179202 A1* | 9/2004 | Sezginer | 356/451 |
| 2005/0122529 A1* | 6/2005 | Kim et al. | 356/503 |

FOREIGN PATENT DOCUMENTS

KR    10-2006-0002653 A    1/2006

* cited by examiner

*Primary Examiner*—Tarifur Chowdhury
*Assistant Examiner*—Jonathan M Hansen
(74) *Attorney, Agent, or Firm*—Mayer & Williams PC; Stuart H. Mayer, Esq.

(57) ABSTRACT

Disclosed herein is an apparatus and method for measuring the thickness and profile of a transparent thin film using a white-light interferometer. The apparatus and method separate coherent light according to frequency, obtain a first interference pattern at each frequency, separate composite coherent light according to frequency, and obtain a second interference pattern at each frequency. Further, the apparatus and method obtain a phase, generated by the thickness of the thin film, from the first interference pattern, and acquire only information about the thickness of the thin film. Further, the apparatus and method obtain a phase from the second interference pattern, and acquires information about the profile of the thin film, including information about the thickness of the thin film. Further, by using the thin film thickness information, information about the profile of the thin film is acquired from the thin film profile information including the thin film thickness information. Therefore, the present invention can process a measurement region with respect to a single point or single line through real-time measurement and a single measurement without requiring a separate driving device, and is resistant to external vibration.

5 Claims, 20 Drawing Sheets

CYLINDRICAL LENS

APPARATUS AND METHOD FOR MEASURING THICKNESS AND PROFILE OF TRANSPARENT THIN FILM USING WHITE-LIGHT INTERFEROMETER

BACKGROUND OF THE INVENTION

1. Field of the Invention

The present invention relates, in general, to an apparatus and method for measuring the thickness and profile of a transparent thin film and, more particularly, to an apparatus and method for measuring the thickness and profile of a transparent thin film using a white-light interferometer.

2. Description of the Related Art

FIG. 1 is a diagram showing the construction of an apparatus for measuring the thickness and profile of a transparent thin film using a conventional white-light interferometer.

The apparatus of FIG. 1 has a structure in which a Michelson interferometer module having a blocking surface is combined with an acousto-optic tunable filter capable of scanning a visible spectrum region. Such a structure can independently measure the thickness and profile of a thin film by turning on or off the blocking surface.

The apparatus of FIG. 1 applies an Acousto-Optic Tunable Filter (hereinafter referred to as "AOTF") 40 to a white-light interference system, so that thickness information and profile information can be separated and independently measured using the interference of monochromatic light with respect to a multi-layered measurement unit 80 composed of a fine thin film layer 83 applied to an opaque metallic layer pattern 82.

A light source 10 for emitting white light is connected to one end of an optical fiber 11 and emits the white light to the other end of the optical fiber 11. The white light, having passed through the optical fiber 11, passes through a fixing member 12 having a central pinhole and spreads from the pinhole. The white light is aligned to have a certain width while passing through a first convex lens 13, and the aligned white light is then incident on a first beam splitter 20. White light passing through the first beam splitter 20 is radiated onto a second convex lens 31. Part of the white light is reflected toward a reference surface 33 while white light passes through the second convex lens 31 and the second beam splitter 32, and the remaining part of the white light penetrates through the second convex lens 31 and the second beam splitter 32 and is radiated onto a measurement unit 80.

A blocking plate 34 is located in front of the reference surface 33 while being spaced apart from the reference surface 33 by a predetermined distance. The blocking plate 34 is parallel to the reference surface 33 at a location close to the reference surface 33, and selectively blocks white light incident on the reference surface 33.

A system including the second convex lens 31, the second beam splitter 32 and the reference surface 33 is a Michelson interferometer module 30. The blocking plate 34 is included in the Michelson interferometer module, so that the Michelson interferometer module 30 is operated in two modes depending on the selective blocking of white light by the blocking plate 34. Further, the white light, which is split by the second beam splitter 32 and is incident on the reference surface 33 and the measurement unit 80, causes variation in wavelength while being radiated onto the measurement unit 80. Such variation is caused because the measurement unit 80 has profile information and thickness information. The profile information and the thickness information can be separated and measured in respective modes based on the operation of the blocking plate 34. The radiated white light is reflected and incident on the AOTF 40. The AOTF 40 performs a filtering operation to separate white light in a frequency band that has thickness information or profile information from white light in the remaining frequency band. The white light, output from the AOTF 40, is focused onto a Charge Coupled Device (CCD) sensor 70 after passing through a third convex lens 50, thus forming an image. The white light focused onto the CCD sensor 70 is scanned as a spectral image to extract respective pieces of information from the spectral image. Further, information about the profile of the fine thin film layer 83 of the measurement unit 80 can be finally obtained using peak point information obtained from the extracted information.

However, such an interferometer is disadvantageous in that, since the filtering range and resolution of an AOTF greatly influence the performance of a system, and a short wavelength of a specific band is selectively scanned, the interferometer performs poorly with respect to real-time measurement and external vibrations. Further, in order to independently obtain the thickness and profile of a thin film, a blocking surface must be turned on or off using hardware, so there is difficulty in simultaneously obtaining two pieces of information. Further, there is a disadvantage in that, since a plurality of unknown quantities related to the thickness and profile of a thin film is obtained using a least square fitting method based on numerical analysis, the time required for measurement greatly increases.

SUMMARY OF THE INVENTION

Accordingly, the present invention has been made keeping in mind the above problems occurring in the prior art, and an object of the present invention is to provide an apparatus and method for measuring the thickness and profile of a transparent thin film using a white-light interferometer, which can simultaneously measure the thickness and profile of the transparent thin film.

In order to accomplish the above object, the present invention provides a method of measuring a thickness and a profile of a transparent thin film, the method acquiring information about a thickness and a profile of a thin film of a measurement object coated with the thin film, comprising a first step of converting white light into light polarized in an arbitrary direction, and separating the polarized light into horizontally polarized light and vertically polarized light, a second step of causing one of the horizontally polarized light and the vertically polarized light to be incident on the measurement object coated with the thin film, and causing a remaining one of the vertically polarized light and the horizontally polarized light to be incident on a reference surface, a third step of generating coherent light while the light incident on the measurement object is reflected from an upper surface and a lower surface of the thin film and reflected light beams interfere with each other, a fourth step of reflecting the light incident on the reference surface to obtain reflected light, and combining the reflected light with the coherent light at the third step to generate composite coherent light, a fifth step of separating the coherent light at the third step according to frequency, and obtaining an interference pattern at each frequency, a sixth step of separating the composite coherent light at the fourth step according to frequency, and obtaining an interference pattern at each frequency, a seventh step of obtaining a phase generated by thickness of the thin film through the interference pattern at each frequency at the fifth step, and acquiring only information about a thickness of the thin film from the phase, an eighth step for obtaining a phase from the interference pattern at each frequency at the sixth step, and acquiring information about a profile of the thin film including information about a thickness of the thin film, and a ninth step of acquiring only information about the profile of the thin film from the thin film profile information including the thin film thickness information, which is acquired at the eighth step, using the thin film thickness information, which is acquired at the seventh step.

Preferably, the obtainment of a phase from the interference pattern may comprise the steps of modeling the interference pattern using an equation (refer to Equation [6] when a thickness of a single layer thin film is measured, whereas refer to Equation [12] when a profile of the single layer thin film is measured), performing high pass filtering to eliminate low frequency components contained in the interference pattern, eliminating an envelope component from the interference pattern, from which the low frequency components have been eliminated, and arranging envelope elimination results as a cosine function including a phase value that contains information about the thickness and profile of the thin film (refer to Equation [8] when a thickness of a single layer thin film is measured, whereas refer to Equation [14] when a profile of the single layer thin film is measured), performing a Fast Fourier Transform (FFT) on the arranged cosine function, taking only a positive frequency component of FFT results, and performing an Inverse FFT (IFFT) on the positive frequency component, taking a natural logarithm of IFFT results, converting natural logarithm results to cause an imaginary number part thereof to be a phase value, and obtaining the phase value (refer to Equation [10] when a thickness of a single layer thin film is measured, whereas refer to Equation [16] when a profile of a single layer thin film is measured), and acquiring the thickness and the profile of the thin film from a slope of the phase value according to frequency and a refractive index N of the thin film (refer to Equations [7] and [21]).

Further, the present invention provides an apparatus for measuring a thickness and a profile of a transparent thin film, comprising a light source for emitting white light, a polarization device for polarizing the white light in an arbitrary direction to generate polarized light and a polarized beam splitter for splitting the polarized light into horizontally polarized light and vertically polarized light, wherein the apparatus is operated in such a way as to cause the horizontally polarized light to be incident on a measurement object coated with a thin film and to be reflected from an upper surface and a lower surface of the thin film, obtain coherent light using reflected light beams, cause the vertically polarized light to be incident on and reflected from a reference surface to obtain reflected light, obtain a phase of the coherent light, acquire information about a thickness of the thin film from the phase, obtain a phase from composite coherent light obtained by causing the coherent light to interfere with the reflected light, acquire information about a profile of the thin film including information about a thickness of the thin film, from the phase of the composite coherent light and acquire information about the thickness and profile of the thin film, from the thin film thickness information, which is acquired from the coherent light, and the thin film profile information including the thin film thickness information, which is acquired from the composite coherent light.

Preferably, the thickness and profile measurement apparatus may further comprise a first diffraction grating for separating the coherent light according to frequency and obtaining separated light beams so as to obtain a phase from the coherent light, a first image acquisition unit for acquiring the separated light beams, wherein image processing and algorithms are applied to the separated light beams to obtain the phase, a 45° polarization plate for obtaining composite coherent light to obtain a phase from the composite coherent light, a second diffraction grating for separating the composite coherent light according to frequency and obtaining separated light beams, and a second image acquisition unit for acquiring the separated light beams, wherein the apparatus is operated in such a way as to obtain the phase by applying the image processing and algorithms to the separated light beams, which are obtained from the composite coherent light, thus acquiring information about the thickness and profile of the thin film.

Further, the present invention provides an apparatus for measuring a thickness and a profile of a transparent thin film, comprising a light source for emitting white light, a beam splitter for splitting the white light, part of which is incident on a measurement object coated with a thin film and reflected from an upper surface and a lower surface of the thin film to obtain coherent light using reflected light beams, and the remaining part of which is incident on and reflected from a reference surface to obtain reflected light, a blocking plate for selectively blocking the reflected light, wherein the apparatus is operated in such a way as to turn on the blocking plate and block the reflected light so as to obtain a phase of the coherent light, obtain the phase from the coherent light, acquire only information about a thickness of the thin film, turn off the blocking plate, obtain a phase from composite coherent light obtained by causing the coherent light and the reflected light to interfere with each other, acquire information about a profile of the thin film including information about a thickness of the thin film, from the phase of the composite coherent phase, and acquire information about the thickness and profile of the thin film, from the thin film thickness information, which is acquired from the coherent light, and the thin film profile information including the thin film thickness information, which is acquired from the composite coherent light.

Preferably, the thickness and profile measurement apparatus may further comprise a diffraction grating for separating the white light according to frequency and obtaining separated light beams so as to obtain the phases from the coherent light and the composite coherent light, and an image acquisition unit for acquiring the separated light beams, wherein the apparatus is operated in such a way as to obtain the phases by applying image processing and algorithms to the separated light beams, thus acquiring the information about the thickness and profile of the thin film.

Further, the present invention provides an apparatus for measuring a thickness and a profile of a transparent thin film, comprising a light source for emitting white light, a polarization device for polarizing the white light in an arbitrary direction to generate polarized light, a polarized beam splitter for splitting the polarized light into horizontally polarized light and vertically polarized light, wherein the horizontally polarized light is incident on a measurement object coated with a thin film and is reflected from an upper surface and a lower surface of the thin film to obtain coherent light using reflected light beams, and the vertically polarized light is incident on and reflected from a reference surface to obtain reflected light, a first diffraction grating for separating the coherent light according to frequency and obtaining separated light beams so as to obtain a phase of the coherent light, a first image acquisition unit for acquiring the separated light beams, wherein image processing and algorithms are applied to the separated light beams to obtain a phase, and then only information about a thickness of the thin film is acquired from the phase, a 45° polarization plate for obtaining composite coherent light by causing the coherent light to interfere with the reflected light, so as to obtain a phase from the composite coherent light, a second diffraction grating for separating the composite coherent light according to frequency and obtaining separated light beams, and a second image acquisition unit for acquiring the separated light beams, wherein the apparatus is operated in such a way as to obtain the phase by applying the image processing and algorithms to the separated light beams obtained from the composite coherent light, acquire information about a profile of the thin film including information about a thickness of the thin film, from the phase of the composite coherent light, and acquire information about the thickness and profile of the thin film from the thin film thickness information, which is acquired from the coherent light, and the thin film profile information including the thin film thickness information, which is acquired from the composite coherent light.

Preferably, a cylindrical lens may be used to obtain the coherent light, the reflected light and the composite coherent light in a line shape, and a cylindrical lens may be used to obtain an interference pattern at each frequency from the line-shaped coherent light and the line-shaped composite coherent light, thus acquiring the information about the thickness and profile of the thin film.

Further, the present invention provides an apparatus for measuring a thickness and a profile of a transparent thin film, comprising a light source for emitting white light, a polarization device for polarizing the white light in an arbitrary direction to generate polarized light, a polarized beam splitter for splitting the polarized light into horizontally polarized light and vertically polarized light, a piezoelectric actuator for scanning and moving a measurement surface of the thin film in a direction of an optical axis, and a Charge Coupled Device (CCD) for acquiring an interference pattern generated by a difference between optical paths, wherein the apparatus is operated in such a way as to cause the horizontally polarized light to be incident on a measurement object coated with the thin film and to be reflected from an upper surface and a lower surface of the thin film, obtain coherent light using reflected light beams, cause the vertically polarized light to be incident on and reflected from a reference surface to obtain reflected light, obtain a phase of the coherent light, acquire only information about a thickness of the thin film from the phase, obtain a phase from composite coherent light obtained by causing the coherent light to interfere with the reflected light, acquire information about a profile of the thin film including information about a thickness of the thin film, from the phase of the composite coherent light, and acquire information about the thickness and profile of the thin film from the thin film thickness information, which is acquired from the coherent light, and the thin film profile information including the thin film thickness information, which is acquired from the composite coherent light.

Preferably, the thickness and profile measurement apparatus may further comprise an image spectroscope for obtaining distribution of light intensity at each wavelength with respect to a single line, based on the coherent light and the composite coherent light, wherein the apparatus is operated in such a way as to analyze distribution of light intensity at each wavelength with respect to each line, obtained by the imaging spectroscope, thereby acquiring the information about the thickness and profile of the thin film.

Preferably, the thickness and profile measurement apparatus may further comprise an automatic focus control device.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
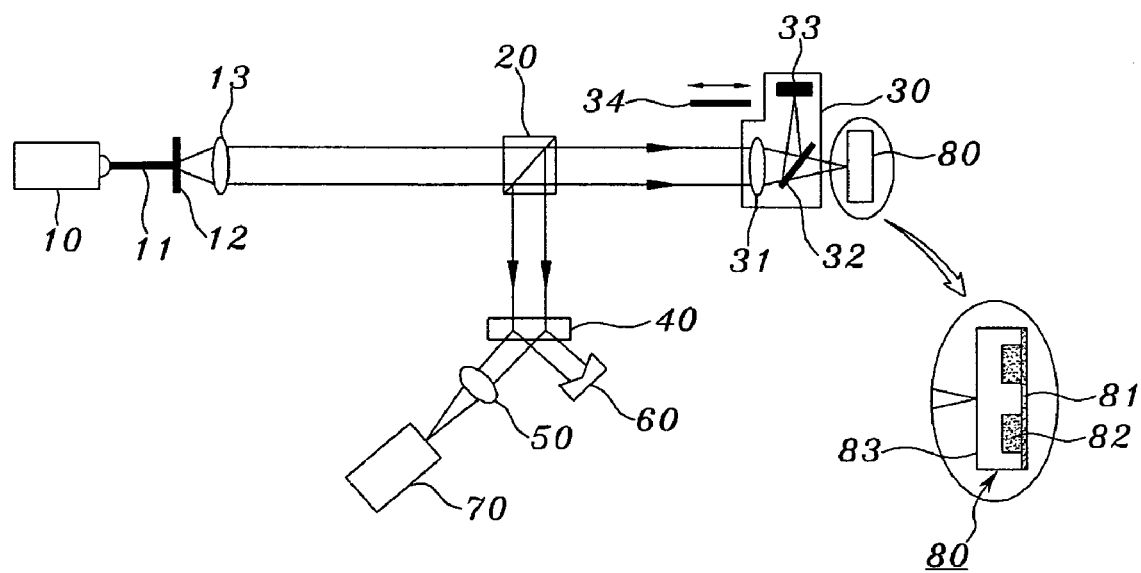
FIG. 1 is a diagram showing the construction of an apparatus for measuring the thickness and profile of a transparent thin film using a conventional white-light interferometer.

Hereinafter, embodiments of the present invention will be described in detail with reference to the attached FIGS. 2 to 11.

Reference now should be made to the drawings, in which the same reference numerals are used throughout the different drawings to designate the same or similar components.

FIGS. 2A, 2B, 3A and 3B illustrate the embodiments of an apparatus for measuring the thickness and profile of a transparent thin film using a white-light interferometer. These embodiments are operated in a mode for measuring the thickness of a thin film and a mode for measuring the profile of a thin film. In the thickness measurement mode, coherent light having light interference signals (information about the thickness of a thin film), which are reflected from the upper surface and the lower surface of the thin film, respectively, and are generated by the difference between optical paths, is analyzed. Further, in the profile measurement mode, composite coherent light having light interference signals (information about the profile of a thin film), which are reflected from a reference surface and the thin film, respectively, and are generated by the difference between optical paths, is analyzed.

Figure 2A:
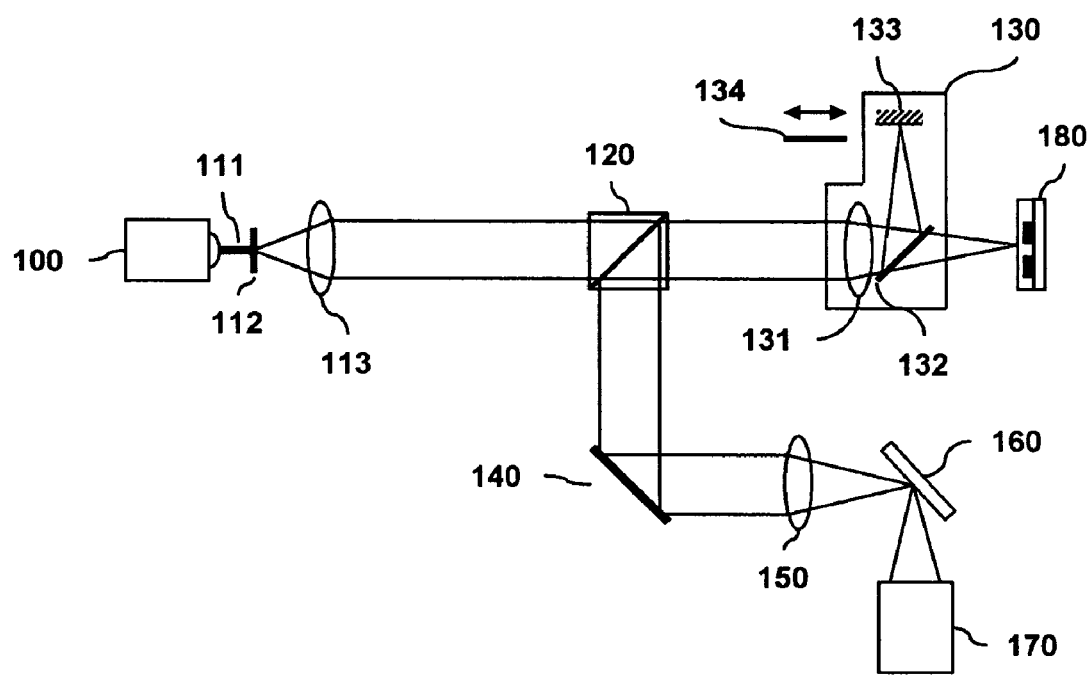
FIG. 2A is a diagram showing the construction of an apparatus for measuring the thickness and profile of a transparent thin film using a white-light interferometer according to a first embodiment of the present invention.

FIG. 2A is a diagram showing the construction of an apparatus for measuring the thickness and profile of a transparent thin film using a white-light interferometer according to a first embodiment of the present invention, which illustrates an example of obtaining thickness information and profile information using a blocking surface that is included in a Michelson interferometer module.

The apparatus for measuring the thickness and profile of a transparent thin film using the white-light interferometer of FIG. 2A has a structure of obtaining information about a measurement region in real time, using a Michelson interferometer module 130 including therein a blocking surface, a condensing lens, and a diffraction grating. Such a structure can independently measure the thickness and the profile of the thin film by turning on or off the blocking surface.

The apparatus of FIG. 2A can separate and independently measure thickness information and profile information using the interference of monochromatic light with respect to a multi-layered measurement unit 180 that is composed of a transparent fine thin film layer (not shown) applied to an opaque metallic layer pattern (not shown).

A light source 100 is a tungsten-halogen lamp for emitting white light, and is connected to one end of a single mode optical fiber 111 in the emission direction of white light to transmit the emitted white light to the other end of the optical fiber 111. A fixing member 112 is located at the other end of the optical fiber 111, and has a central pinhole connected to the other end of the optical fiber 111. The white light emitted through the pinhole spreads around the pinhole. In this case, a first convex lens 113 is located in front of the fixing member 112, that is, in the emission direction of white light, and is spaced apart from the fixing member 112 by a predetermined distance. The white light is emitted as parallel light having a certain width while passing through the first convex lens 113. The white light, having passed through the first convex lens 113, is incident on a first beam splitter 120 spaced apart from the first convex lens 113 by a predetermined distance. The first beam splitter 120 has the form of a non-polarized cube capable of splitting incident white light in the ratio of fifty to fifty, and performs separation sequentially according to a measurement process, rather than simultaneously.

The reflection angle of the first beam splitter 120 is about 45° with respect to the direction in which white light is incident on the first beam splitter 120, so that the white light is reflected to be perpendicular to the incident direction. A second convex lens 131 is located to correspond to the reflection angle of the first beam splitter 120. Unlike the first convex lens 113 for emitting transmitted white light as parallel light, the second convex lens 131 performs a focusing operation to focus the transmitted white light onto one point depending on the direction of progression of the white light. In this case, part of the white light, which reaches a second beam splitter 132, is reflected toward a reference surface 133, and the remaining part of the white light passes through the second beam splitter 132 and is radiated onto a measurement unit 180. A blocking plate 134 is disposed in front of the reference surface 133 while being spaced apart from the reference surface 133 by a predetermined distance. The blocking plate 134 is parallel to the reference surface 133 at a location close to the reference surface 133, and is adapted to selectively block the white light incident on the reference surface 133.

As described above, a system, including the second convex lens 131, the second beam splitter 132 and the reference surface 133, is a Michelson interferometer module 130. The blocking plate 134 is included in the Michelson interferometer module 130, so that the Michelson interferometer module 130 is operated in two modes depending on the selective blocking of white light performed by the blocking plate 134.

Moreover, the white light, which is split by the second beam splitter 132 and is incident on the reference surface 133 and the measurement unit 180, causes variation in wavelength while being radiated onto, in particular, the measurement unit 180. Such variation is caused because the measurement unit 180 has profile information and thickness information. The profile information and the thickness information can be separated and measured depending on respective modes based on the operation of the blocking plate 134.

The white light radiated in this way is reflected from the measurement unit 180 and passes through the second beam splitter 132. The width of white light is aligned again while the white light passes through the second convex lens 131, and is converted into parallel light. Further, the parallel light is reflected from the first beam splitter 120 and a reflection mirror 140, and is then incident on a condensing lens 150. Further, the parallel light, having passed through the condensing lens 150, is diffracted while colliding with a diffraction grating 160. The white light, diffracted while passing through the diffraction grating 160, is detected by a CCD 170, and is then acquired as an interference signal having information about the thickness and profile of the thin film.

That is, the process is described for each mode. The white light, split by the beam splitter 120 to acquire information about the thickness of a thin film, is incident on the measurement unit 180 coated with the thin film, and is reflected from the upper surface and the lower surface of the thin film, thereby obtaining coherent light. The blocking plate 134 is turned on so as to obtain the phase of the coherent light, thus acquiring only thickness information. Further, the blocking plate 134 is turned off to acquire profile information, so that the coherent light, obtained by reflecting the white light split by the beam splitter 120 from the measurement unit 180, is caused to interfere with the light reflected from the reference surface 133, thus obtaining composite coherent light. Therefore, information about the profile of the thin film can be acquired. That is, information about the profile of the thin film, including information about the thickness of the thin film, is obtained from the phase of the composite coherent light. Information about the thickness and profile of the thin film is acquired from the thin film thickness information, which is obtained from the coherent light, and the thin film profile information including the thin film thickness information, which is obtained from the composite coherent light.

Figure 2B:
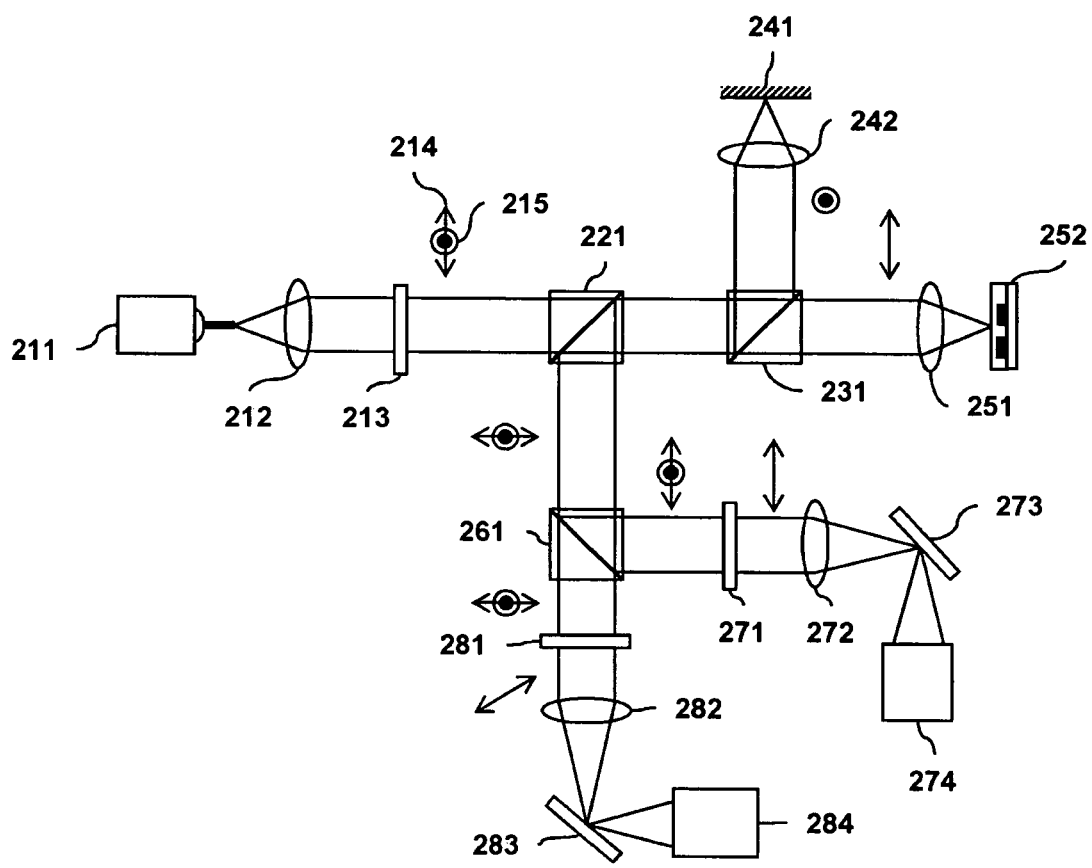
FIG. 2B is a diagram showing the construction of an apparatus for measuring the thickness and profile of a transparent thin film using a white-light interferometer according to a second embodiment of the present invention.

Such a process is described for each step. First, the white light emitted from the light source is split into two white light beams using the beam splitter. One of the two white light beams is incident on the measurement unit coated with the thin film and is reflected from the upper surface and the lower surface of the thin film, thus obtaining coherent light using reflected light beams. Further, the remaining one of the two white light beams is incident on the reference surface and is reflected from the reference surface, thus obtaining reflected light. In this case, composite coherent light is generated by combining the coherent light with the reflected light FIG. 2B is a diagram showing the construction of an apparatus for measuring the thickness and profile of a transparent thin film using a white-light interferometer according to a second embodiment of the present invention. In this case, thin film thickness information and thin film profile information are directly separated using the polarization of light, and are measured in real time.

In FIG. 2B, white light emitted from a light source 211 is converted into parallel light while passing through a collimating lens 212, and is then incident on a polarization device 213. The polarization device 213 functions to cause the intensity of light incident on a reference surface and the intensity of light incident on a measurement surface to be similar to each other, and emits incident parallel light as arbitrarily polarized light. That is, the polarization device 213 adjusts the size of horizontally and vertically polarized light to the same. Horizontally polarized light 214 and vertically polarized light 215 are separated from each other and are incident on a measurement surface 252 and a reference surface 241, respectively. An interference signal formed by the thickness of the thin film of the measurement surface 252 is the horizontally polarized light 214. The horizontally polarized light 214 is reflected from the measurement surface 252 and is then emitted as coherent light. The light reflected from the reference surface 241 is the vertically polarized light 215. The vertically polarized light 215 is reflected from the reference surface 241 and is emitted as reflected light. The two light beams 214 and 215 are sequentially incident on beam splitters 221 and 261 through a polarizing beam splitter 231. The beam splitter 261 reflects the incident light and emits the reflected light to a horizontal polarization device 271 so as to measure the thickness of the thin film, and passes the incident light therethrough and emits the passed light to a polarizer 281 so as to measure the profile of the thin film. The horizontal polarization device 271 passes only coherent light, which is the horizontally polarized light, therethrough, and causes the coherent light to be incident on a diffraction grating 273 through a condensing lens 272. The diffraction grating 273 transmits separated light to a CCD 274, thus obtaining the distribution of light intensity at each wavelength with respect to a single point. Meanwhile, the polarizer 281 causes the coherent light, which is the horizontally polarized light 214, and the reflected light, which is the vertically polarized light 215, to interfere with each other, thus obtaining composite coherent light. Further, the polarizer 281 allows the composite coherent light to pass through a diffraction grating 283, thus obtaining separated light beams according to frequency through a CCD 284. After the phase of the composite coherent light is obtained by applying image processing and algorithms to the separated light beams that are obtained from the composite coherent light, information about the profile of the thin film, including information about the thickness of the thin film, is acquired from the phase of the composite coherent light. Information about the thickness and profile of the thin film is acquired from both the thin film thickness information, which is acquired from the coherent light, and the thin film profile information including the thin film thickness information, which is acquired from the composite coherent light.

Such a process is described for each step. First, white light is converted into arbitrarily polarized light, which is separated into horizontally polarized light and vertically polarized light. The horizontally polarized light is incident on the measurement surface coated with the thin film, and the vertically polarized light is incident on the reference surface. Further, coherent light is generated while the light incident on the measurement surface is reflected from the upper surface and the lower surface of the thin film and the reflected light beams interfere with each other. Reflected light is generated by reflecting the light incident on the reference surface. Further, composite coherent light is generated by combining the coherent light with the reflected light.

Figure 3A:
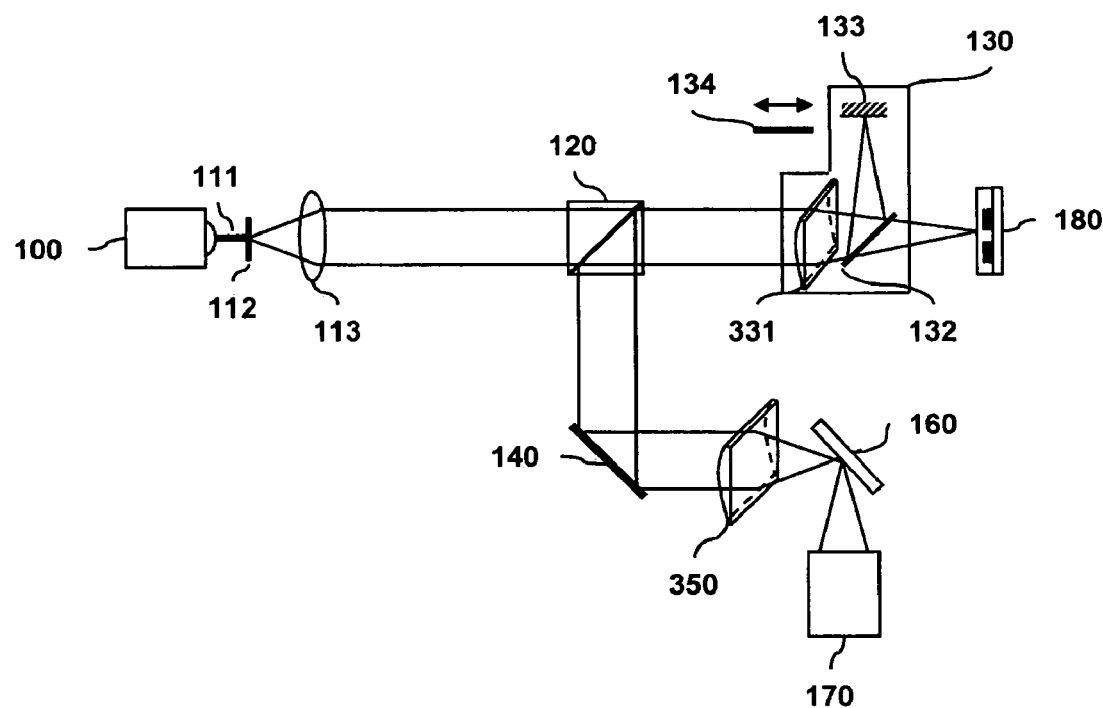
FIG. 3A is a diagram showing the construction of an apparatus for measuring the thickness and profile of a transparent thin film using a white-light interferometer according to a third embodiment of the present invention.

FIG. 3A is a diagram showing the construction of an apparatus for measuring the thickness and profile of a transparent thin film using a white-light interferometer according to a third embodiment of the present invention.

The embodiment of FIG. 3A is an apparatus having the same construction as the first embodiment of FIG. 2A, but there is a difference in that a condensing lens is replaced with cylindrical lenses 331 and 350. The remaining components of FIG. 3A, indicated by the same reference numerals as those of FIG. 2A, perform the same functions, so detailed descriptions thereof are omitted. Referring to FIG. 3A, the cylindrical lenses 331 and 350 extend a measurement region from a single point to a single line.

Figure 3B:
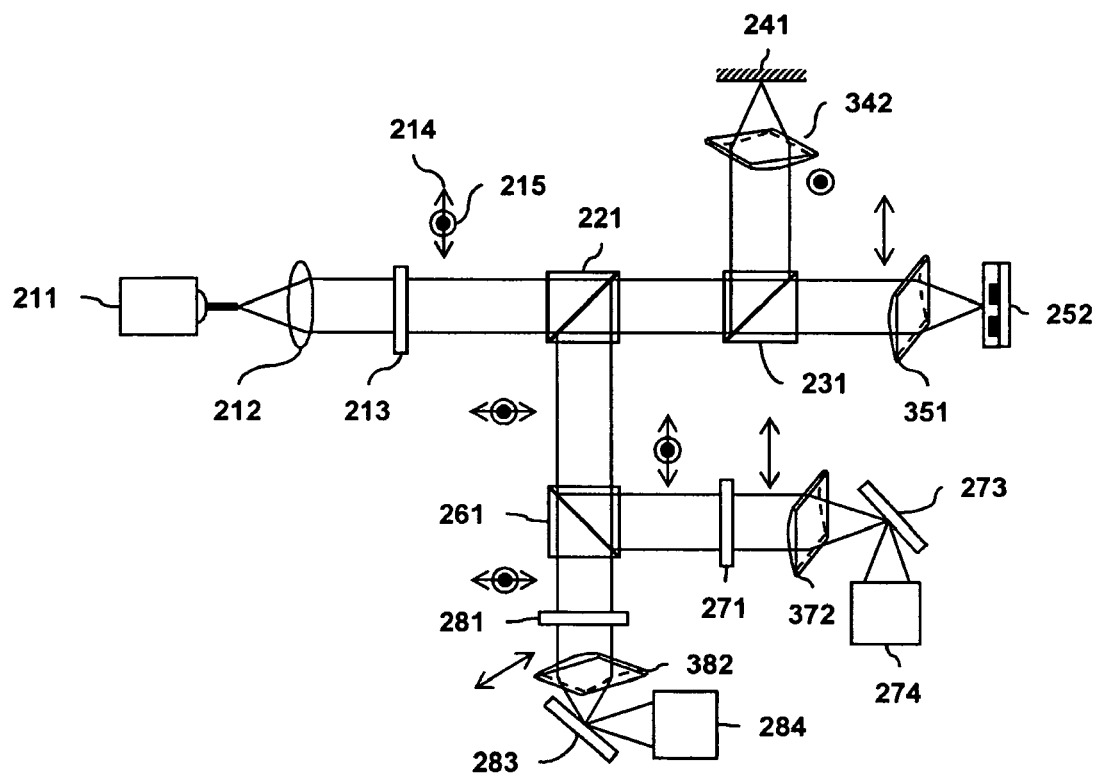
FIG. 3B is a diagram showing the construction of an apparatus for measuring the thickness and profile of a transparent thin film using a white-light interferometer according to a fourth embodiment of the present invention.

FIG. 3B is a diagram showing the construction of an apparatus for measuring the thickness and profile of a transparent thin film using a white-light interferometer according to a fourth embodiment of the present invention.

The embodiment of FIG. 3B is an apparatus having the same construction as the first embodiment of FIG. 2B, but there is a difference in that a condensing lens is replaced with cylindrical lenses 342, 351, 372 and 382. Further, the remaining components of FIG. 3B, indicated by the same reference numerals as those of FIG. 2B, perform the same functions, so detailed descriptions thereof are omitted. Referring to FIG. 3B, the cylindrical lenses 342, 351, 372 and 382 extend a measurement region from a single point to a single line.

Figure 3C:
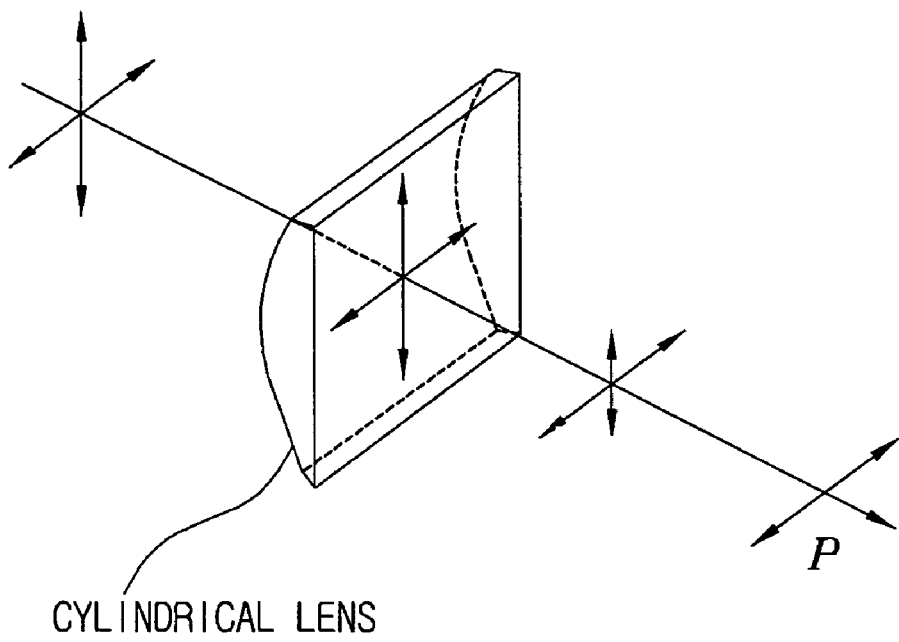
FIG. 3C is a view showing a process of shaping light into sheet light using a cylindrical lens according to the embodiment of FIG. 3B.

FIG. 3C is a view showing a process of shaping light into sheet light using a cylindrical lens according to the embodiment of FIG. 3B. That is, the cylindrical lens of FIG. 3C shapes the light into sheet light at position P.

Figure 3D:
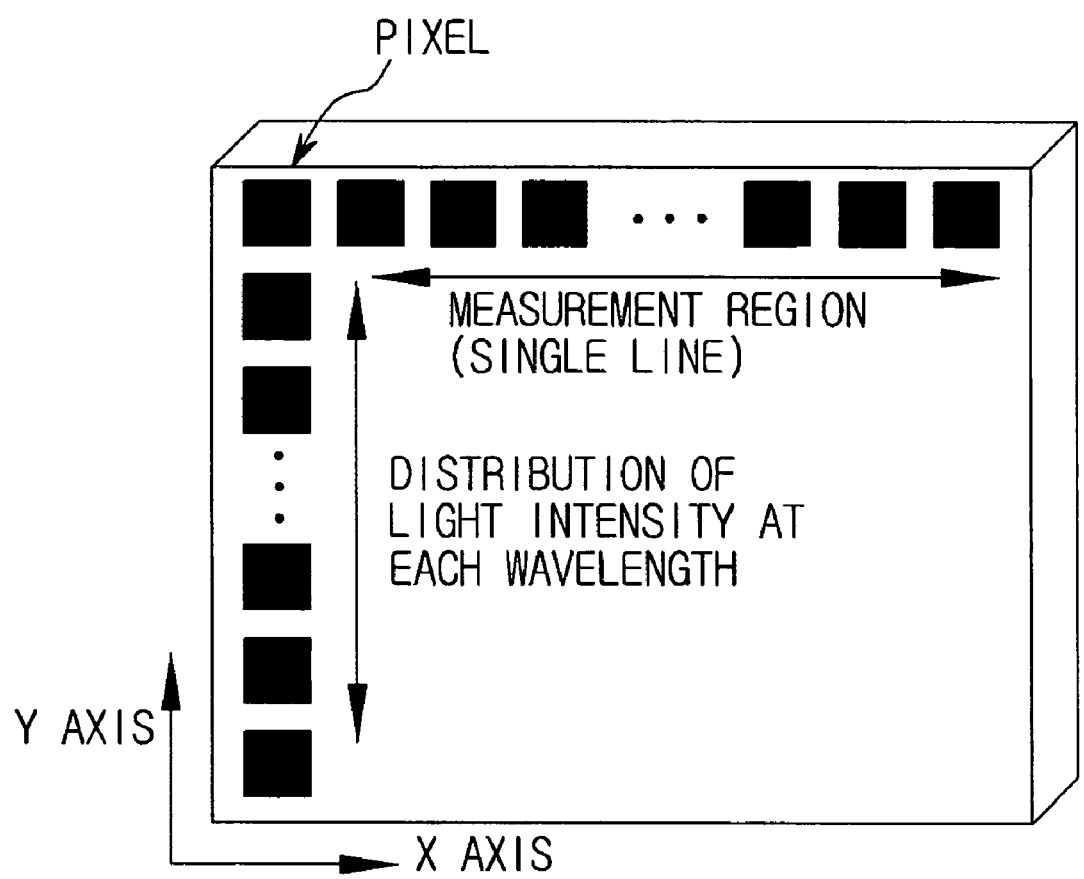
FIG. 3D is a view showing information displayed on a CCD surface, in which an X axis represents a single line in a measurement region, and a Y axis represents the distribution of light intensity at each wavelength.

FIG. 3D is a view showing information displayed on a two-dimensional CCD surface, in which an X axis represents a single line in a measurement region, and a Y axis represents the distribution of light intensity at each wavelength. That is, when a measurement region is displayed on the CCD surface when the measurement region is extended from a single point to a single line by the cylindrical lens used in the third and fourth embodiments. Each pixel displayed on the X axis of the CCD denotes each point on the single line, which is the measurement region, and each pixel displayed on the Y axis of the CCD denotes the distribution of light intensity at each wavelength.

Hereinafter, with reference to FIGS. 4 to 8, a method of measuring the thickness and profile of a transparent thin film using an interference signal, obtained by the apparatus for measuring the thickness and profile of a transparent thin film using an interferometer according to the first to fourth embodiments, is described in detail. An interference signal described below denotes coherent light and composite coherent light FIG. 4 is a diagram showing a process of simultaneously calculating the thickness and profile of a thin film according to the present invention.

Figure 4:
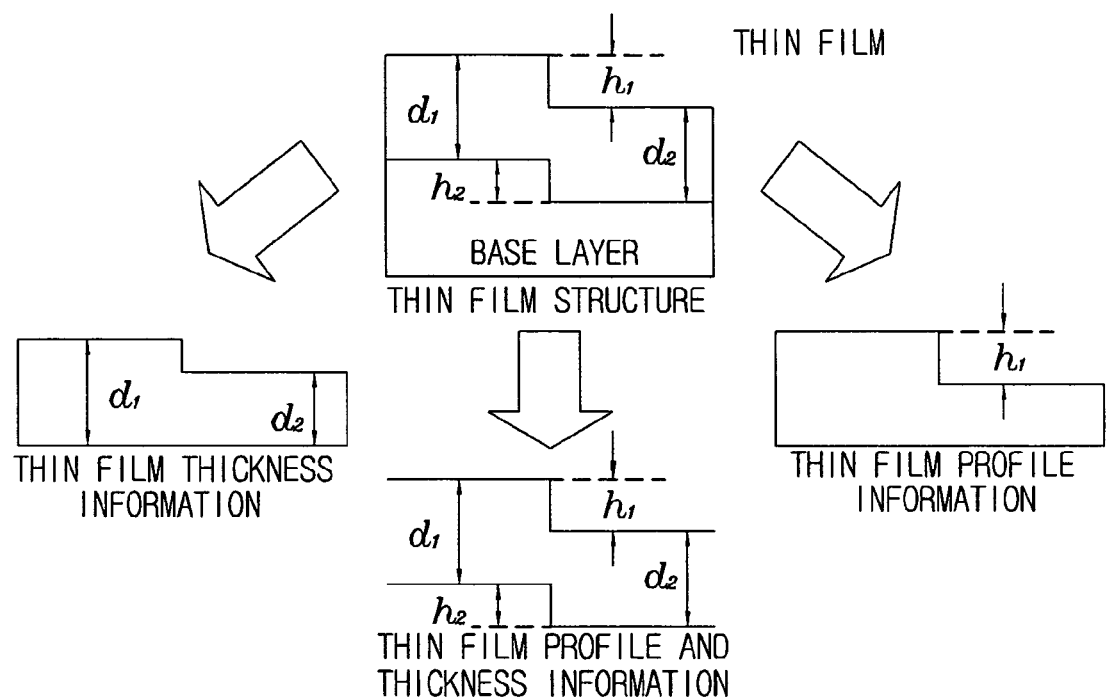
FIG. 4 is a view showing a process of simultaneously calculating the thickness and profile of a thin film according to the present invention.

FIG. 4 illustrates a process of separately acquiring thin film thickness information and thin film profile information about a thin film structure, which is a measurement object, and finally acquiring information about the profile and thickness of the thin film. The profile information is denoted by h, and the thickness information is denoted by d.

Figure 5:
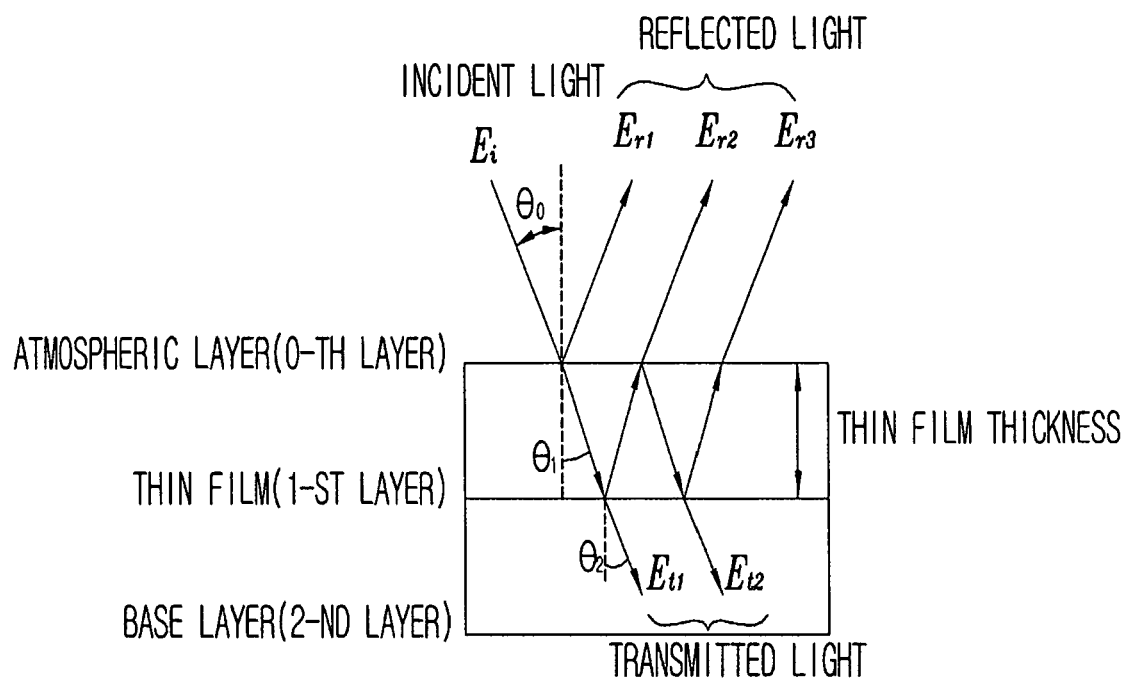
FIG. 5 is a view showing light incident on, light reflected from, and light transmitted through, a single layer pattern (thin film), which is a measurement object, according to the present invention.

FIG. 5 is a view showing light incident on, light reflected from, and light transmitted through, the single layer pattern (thin film) of a thin film structure, which is the measurement object of FIG. 4.

Referring to FIG. 5, if it is assumed that a light beam reflected from the upper surface of the thin film is $E_{r1}$, and light beams reflected from the lower surface of the thin film are $E_{r2}, E_{r3}, \ldots$, an algorithm for calculating the thickness d of the thin film can be obtained by the following Equations [1] to [11], and an algorithm for calculating the profile L of the thin film can be obtained by the following Equations [12] to [21].

The algorithms are briefly described. An unnecessary low frequency component of the interference signal, obtained by the above-described apparatus, is eliminated through a filtering operation such as high pass filtering, and then an FFT is performed on the filtered interference signal. Further, an Inverse FFT (IFFT) is performed on the FFT results, so that only a phase value of a final interference pattern is obtained Since the phase value includes information about the thickness and profile of the thin film, the thickness information and the profile information can be separated from the phase value and independently obtained.

First, an algorithm for calculating the thickness d of the thin film is described. The interference pattern equation for the interference signal of coherent light, reflected from the upper surface and the lower surface of the thin film of FIG. 5, is expressed by the following Equation [1], $$I_1 = (E_{r1} + E_{r2} + E_{r3} + \ldots)(E_{r1} + E_{r2} + E_{r3} + \ldots)^* \quad [1]$$

where * denotes a complex conjugate. In this case, $E_{r1}, E_{r2}, E_{r3}$, can be expressed by the following Equation [2]:

$$E_{r1} = r_{01} E_i \quad [2]$$
$$E_{r2} = t_{01} r_{12} t_{10} e^{-\beta j} E_i$$
$$E_{r3} = t_{01} r_{12} t_{10} r_{10} r_{12} e^{-2\beta j} E_i$$
$$E_{r4} = t_{01} r_{12} t_{10} (r_{10} r_{12})^2 e^{-3\beta j} E_i$$
$$\vdots$$
$$E_m = t_{01} r_{12} t_{10} (r_{10} r_{12})^{n-2} e^{-(n-1)\beta j} E_i$$

In this case, $r_{ij}$ and $t_{ij}$ denote a Fresnel reflection coefficient and a transmission coefficient between i-th and j-th layers, respectively, and β denotes variation in phase undergone by light passing into a thin film having a thickness d, and is indicated by the following Equation [3].

$$\beta = 2kNd \cos\theta \quad [3]$$

In this case, if θ=0° is assumed, β=2kNd is satisfied.

If the thin film is reversible, that is, if the refractive index of the thin film is a real number, the relationship of $r_{01} = -r_{10}$ and $t_{01} t_{10} = 1 - r_{01}^2$ can be applied, so Equation [4] can be simply obtained.

$$E_{r1} = r_{01} E_i \quad [4]$$
$$E_{r2} = (1 - r_{10}^2) r_{12} e^{-\beta j} E_i$$
$$E_{r3} = (1 - r_{10}^2) r_{12} (-r_{01} r_{12}) e^{-2\beta j} E_i$$
$$E_{r4} = (1 - r_{10}^2) r_{12} (-r_{01} r_{12})^2 e^{-3\beta j} E_i$$
$$\vdots$$
$$E_m = (1 - r_{10}^2) r_{12} (-r_{01} r_{12})^{n-2} e^{-(n-1)\beta j} E_i$$

If $(1 - r_{01}^2) r_{12} = a$ and $(-r_{01} r_{12}) = b$ are assumed to more simply express Equation [4], Equation [4] can be simply expressed by the following Equation [5].

$$E_{r1} = r_{01} E_i \quad [5]$$
$$E_{r2} = a e^{-\beta j} E_i$$
$$E_{r3} = ab e^{-2\beta j} E_i$$
$$E_{r4} = ab^2 e^{-3\beta j} E_i$$
$$\vdots$$
$$E_m = ab^{n-2} e^{-(n-1)\beta j} E_i$$

If Equation [5] is applied to Equation [1] and then arranged, the following Equation [6] is obtained.

$$I_1 = (E_{r1} + E_{r2} + E_{r3} + \cdots)(E_{r1} + E_{r2} + E_{r3} + \cdots)^* \quad [6]$$
$$= \left(r_{01}^2 + \frac{a^2}{1-b^2}\right) + 2a\left(r_{01} + ab\frac{1}{1-b^2}\right)\cos\beta +$$
$$2ab\left(r_{01} + ab\frac{1}{1-b^2}\right)\cos 2\beta + \cdots +$$
$$2ab^{n-1}\left(r_{01} + ab\frac{1}{1-b^2}\right)\cos n\beta$$

Referring to Equation [6], it can be seen that the interference pattern equation for obtaining the thickness of the thin film is completed. That is, β including information about the thickness of the thin film is contained in the interference pattern equation as the repetitive frequency component of a cosine function.

The thickness d of the thin film can be expressed by the following Equation [7] using the relationship between β and d in Equation [3].

$$d = \frac{1}{2N}\frac{d\beta}{dk} \quad [7]$$

Figure 6A:
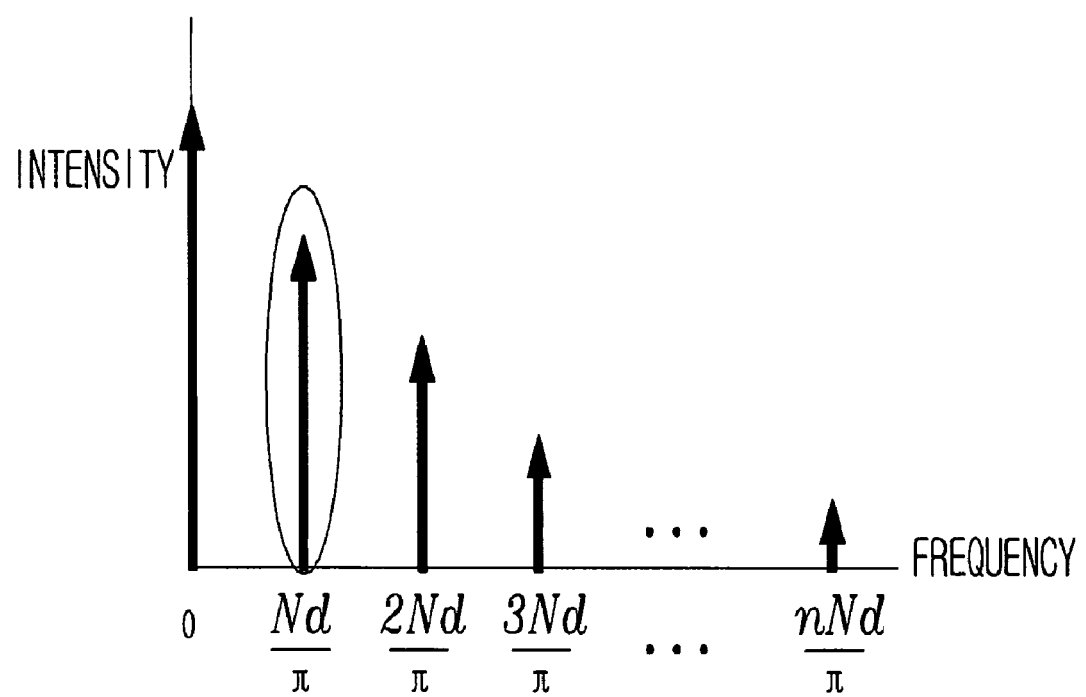
FIG. 6A is a graph showing the distribution of light intensity at each frequency obtained when the frequency of light reflected from a single layer thin film is analyzed (when a Fast Fourier Transform (FFT) is performed on Equation [6])

As shown in Equation [7], since β is the function of k, the distribution of light intensity at each frequency, obtained by performing a Fast Fourier Transform (FFT) on Equation [6] with respect to frequency ν, is shown in FIG. 6A.

Figure 6B:
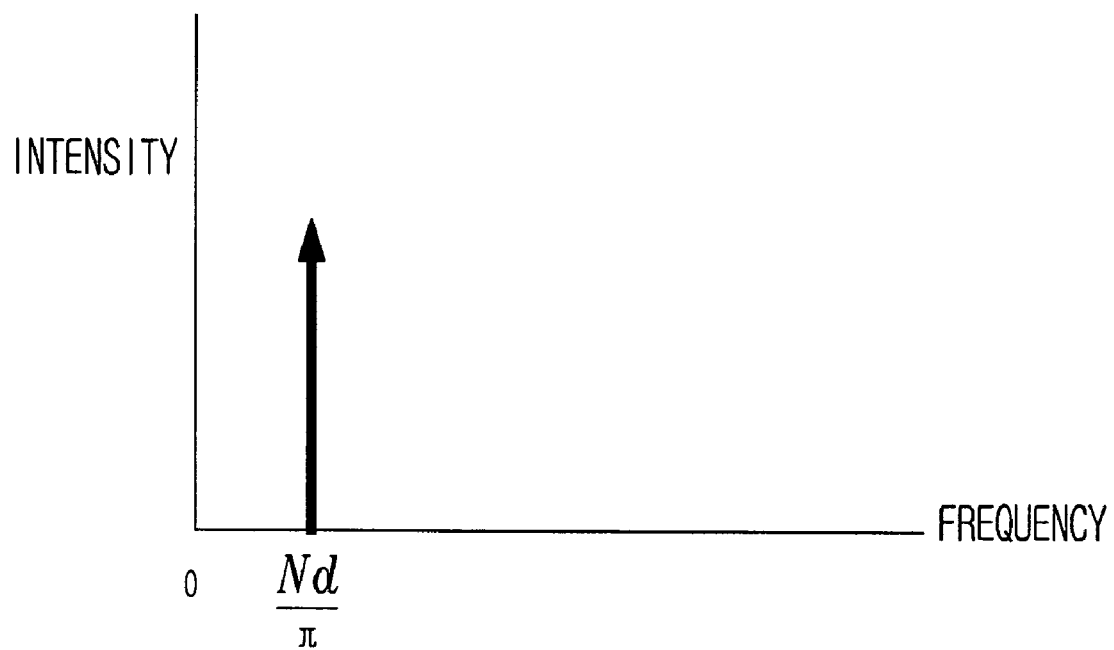
FIG. 6B is a graph showing the distribution of light intensity at each frequency obtained when only one of a plurality of frequency components in FIG. 6A is extracted.
Figure 6C:
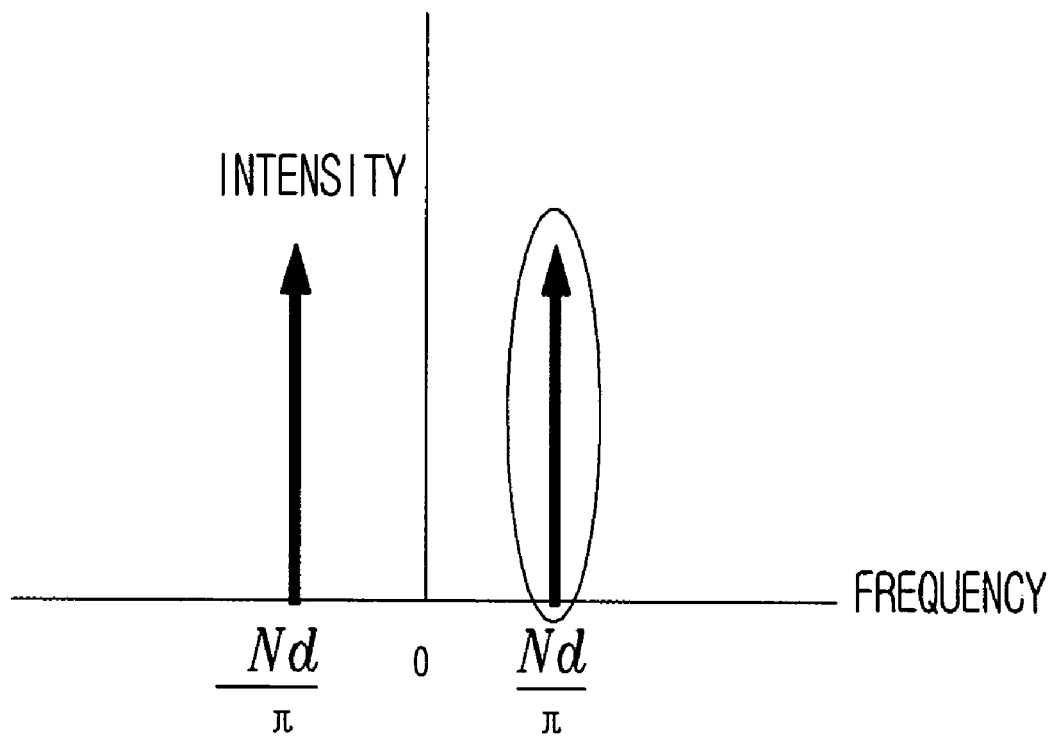
FIG. 6C is a graph showing the distribution of light intensity at each frequency obtained when an FFT is performed on Equation [14]

As shown in FIG. 6A, a value corresponding to the thickness d of the thin film is indicated by $$\frac{Nd}{\pi}, \frac{2Nd}{\pi}, \frac{3Nd}{\pi}, \cdots, \frac{nNd}{\pi}$$

as frequency components. Therefore, if only a frequency component having the highest intensity $$\frac{nNd}{\pi}$$

is extracted, the graph of FIG. 6B is obtained.

Further, if an IFFT is performed on the signal obtained in FIG. 6B, the following Equation [8] is obtained.

$$I = 2a\left(r_{01} + ab\frac{1}{1-b^2}\right)\cos\beta = 2a\left(r_{01} + ab\frac{1}{1-b^2}\right)\frac{e^{-i\beta} + e^{i\beta}}{2} \quad [8]$$

If an FFT is performed again on Equation [8] which is a cosine function, frequency components $$-\frac{Nd}{\pi} \text{ and } \frac{Nd}{\pi}$$

are obtained. If only a positive frequency component is extracted and an IFFT is performed on the positive frequency component, Equation [9] is obtained.

$$I = 2a\left(r_{01} + ab\frac{1}{1-b^2}\right)\frac{e^{i\beta}}{2} \quad [9]$$

If the natural logarithm of Equation [9] is taken, Equation [10] is obtained.

$$\ln I_3 = \ln\left[a\left(r_{01} + ab\frac{1}{1-b^2}\right)\right] + i\beta \quad [10]$$

If only an imaginary number part of Equation [10] is taken, the phase value β can be obtained.

Figure 6D:
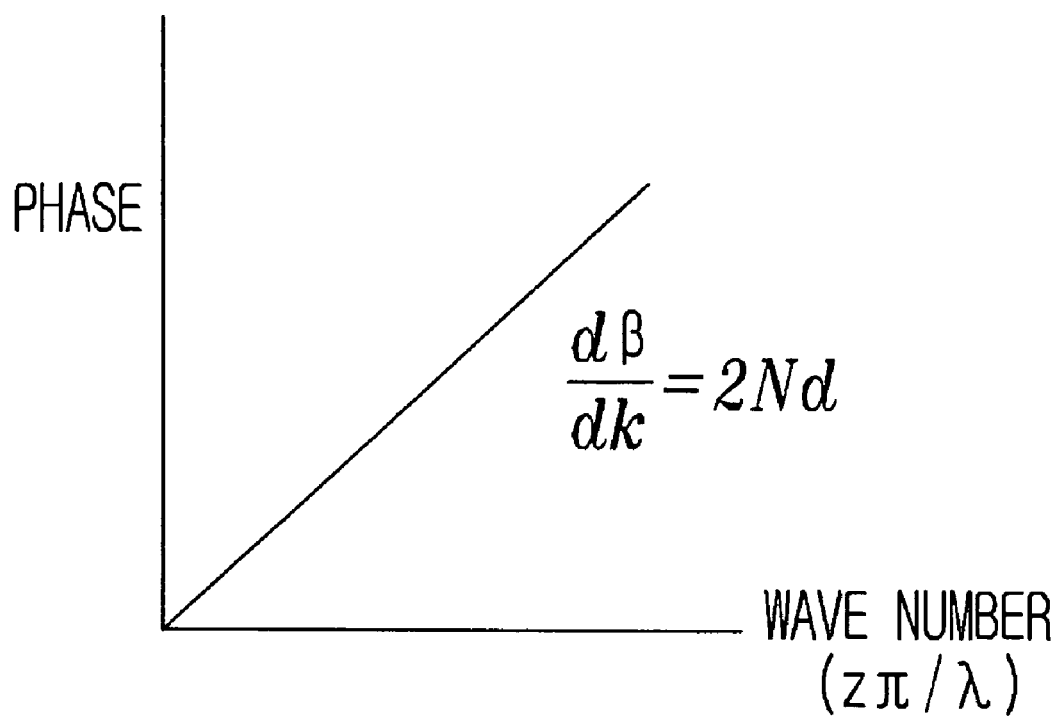
FIG. 6D is a graph showing the slope of a phase based on the thickness of a film and a wave number at the time of calculating the thickness of a transparent thin film.

Further, if the slope of the phase value β according to a wave number is obtained using Equation [7], as shown in FIG. 6D, the thickness d of the thin film can be obtained. In this case, d is influenced by the refractive index N, so that the refractive index must be compensated for so as to precisely measure the thickness d.

Figure 7:
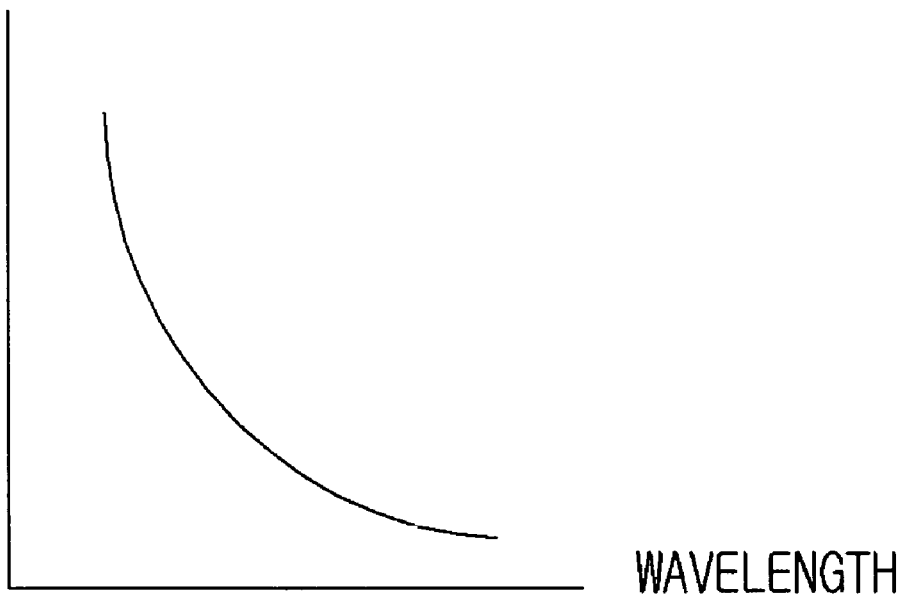
FIG. 7 is a graph showing variation in a refractive index according to a wavelength fitted to a curve using a Cauchy equation.

Therefore, if the refractive index N is fitted to a curve using a Cauchy equation of Equation [11], as shown in FIG. 7, and a refractive index according to wave number is compensated for in Equation [7], the thickness d of the thin film calculated in consideration of the influence of dispersion can be obtained.

$$N = A + \frac{B}{\lambda^2} + \frac{C}{\lambda^4} \quad [11]$$

In Equation [11], A, B and C are constants based on the curve of refractive indices of a material.

Next, an algorithm for calculating the profile L of the thin film is performed by a procedure equal to the procedure for obtaining the thickness d, which is described below.

An interference signal, generally obtained in a mode for measuring the profile of a thin film, denotes composite coherent light, and the interference pattern equation for the interference signal is expressed by the following Equation [12], $$I_1 = A(\nu) + B(\nu)\cos\theta(\nu) \quad [12]$$

where A(ν) is a function of the frequency distribution of a light source, and includes a low frequency component. In Equation [12], if the low frequency component A(ν) is filtered out, Equation [13] is obtained.

$$I_2 = B(\nu)\cos\theta(\nu) \quad [13]$$

In Equation [13], a component to be obtained is cos θ(ν), so that Equation [14] is obtained if B(ν), which is an envelope component of I, is obtained, and Equation [13] is divided by B(ν).

$$I_3\cos\phi(\nu) = \frac{e^{-i\phi(\nu)} + e^{i\phi(\nu)}}{2} \quad [14]$$

The following Equation [15] is obtained if an FFT is performed on Equation [14] which is a cosine function, only a positive frequency component is extracted from FFT the results, and an IFFT is performed on the positive frequency component.

$$I_4 = \frac{e^{i\phi(\nu)}}{2} \quad [15]$$

If the natural logarithm of Equation [15] is taken, the following Equation [16] is obtained.

$$\ln I_4 = \ln\frac{1}{2} + i\phi(\nu) \quad [16]$$

If only an imaginary number part of Equation [16] is taken, a phase component θ(ν) can be easily obtained. The phase component θ(ν) is expressed by the following Equation [17].

$$\phi(\nu) = \frac{2\pi}{c}2NL\nu + \delta(d) \quad [17]$$

In this case, ν is frequency and δ(d) is variation in phase, caused by the thickness d of the thin film, and can be expressed as $$\delta(d) = \angle R = \tan^{-1}(b/a), R = a + jb \quad [18]$$

where the parameter R is defined as the total reflection coefficient and is derived as $$R = \frac{r_{01} + r_{12}\exp(-j2\beta)}{1 + r_{01}r_{12}\exp(-j2\beta)}. \quad [19]$$

In Equation [17], since d has been previously measured in the mode for measuring the thickness of a thin film and δ(d) can be easily calculated from Equation [18] and [19], δ(d) can be easily separated from Equation [17], and expressed by the following Equation [20].

$$\phi(v)^* = \frac{2\pi}{c} 2Lv \qquad [20]$$

The profile component L can be obtained using Equation [20], as shown in Equation [21].

$$L = \frac{c}{4\pi} \frac{d\phi^*}{dv} = \frac{1}{2N} \frac{d\phi^*}{dk} \qquad [21]$$

Therefore, the thickness information d and the profile information L can be independently and easily calculated using Equations [7] and [21].

Such a process is described according to each step. Coherent light is separated according to frequency, and a first interference pattern at each frequency is obtained. Composite coherent light is separated according to frequency, and a second interference pattern at each frequency is obtained. The phase generated by the thickness of the thin film is obtained using the first interference pattern, and only information about the thickness of the thin film is acquired from the phase. A phase is obtained from the second interference pattern, and thin film profile information, including thin film thickness information, is acquired. Information about the profile of the thin film is acquired from the thin film profile information including the thin film thickness information, based on the thin film thickness information.

Figure 8A:
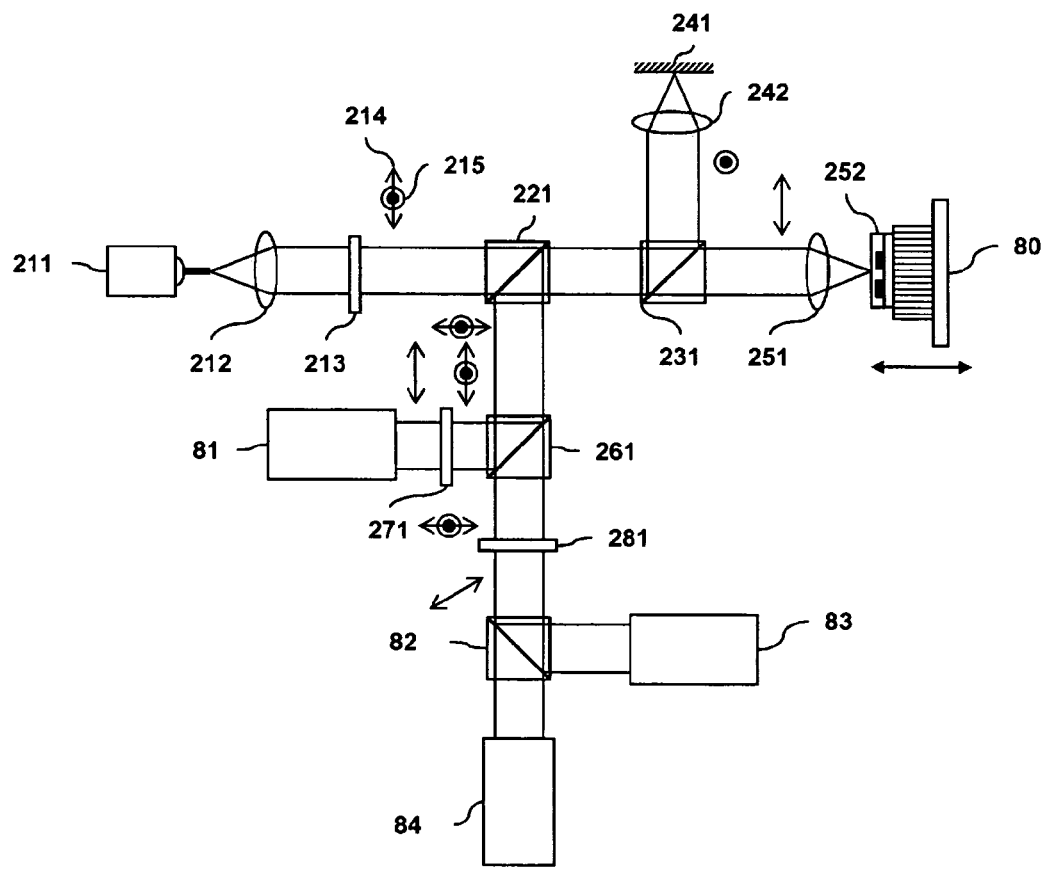
FIG. 8A is a diagram showing the construction of an apparatus for measuring the thickness and profile of a transparent thin film using a white-fight interferometer according to a fifth embodiment of the present invention.

FIG. 8A is a diagram showing the construction of an apparatus for measuring the thickness and profile of a transparent thin film using a white-light interferometer according to a fifth embodiment of the present invention.

The embodiment of FIG. 8A differs from the second embodiment of FIG. 2B in that a piezoelectric actuator 80 is mounted, and a CCD 84 is provided to obtain an interference pattern generated by the difference between optical paths. Further, a component, including the CCDs 274 and 284 of the second embodiment of FIG. 2B, for obtaining coherent light and composite coherent light is replaced with imaging spectroscopes 81 and 83. That is, the condensing lens 272, the diffraction grating 273 and the CCD 274 of the second embodiment of FIG. 2B are replaced with the imaging spectroscope 81. The condensing lens 282, the diffraction grating 283 and the CCD 284 of FIG. 2B are replaced with the imaging spectroscope 83. Such imaging spectroscopes 81 and 83 will be described in detail later with reference to FIG. 9.

The apparatus of the fifth embodiment of FIG. 8A performs the same operations as the second embodiment of FIG. 2B with respect to the same components. A piezoelectric actuator 80 scans and moves a measurement surface 252 in the direction of an optical axis, thus obtaining an interference pattern generated by the difference between optical paths through a CCD 84. The fifth embodiment is implemented by combining a white-light scanning interference measurement with a dispersive white-light interferometer (refer to the second embodiment). The white-light scanning interference measurement requires a transfer mechanism allowing a measurement object to be continuously moved in the direction of an optical axis. If the measurement object is transferred, the intensity of a light beam obtained by a light receiving device (that is, a CCD 84) is a harmonic functions surrounded by a Sinc function. At this time, the position at which light intensity peaks is detected. As the transfer device, the above-described piezoelectric actuator 80 is used, and is capable of transferring the measurement object at nanometer resolution. As a position detector, a capacitive position detector or Linear Variable Differential Transformer (LVDF) is generally used. Further, a method of estimating the position of the piezoelectric actuator using an input voltage applied to the piezoelectric actuator without using a separate position detector is also widely used. In this case, suitable correction of the hysteresis of the piezoelectric actuator is required. A the dimensional fine profile of the measurement object can be implemented by combining the distances between locations, at which a light receiving device obtains peak light intensity, and the position detector with each other. As described above, if white light is used, the measurement of a profile including all height differences is possible within the stroke range of the piezoelectric actuator, without limitations in the height difference of the measurement object.

Figure 8B:
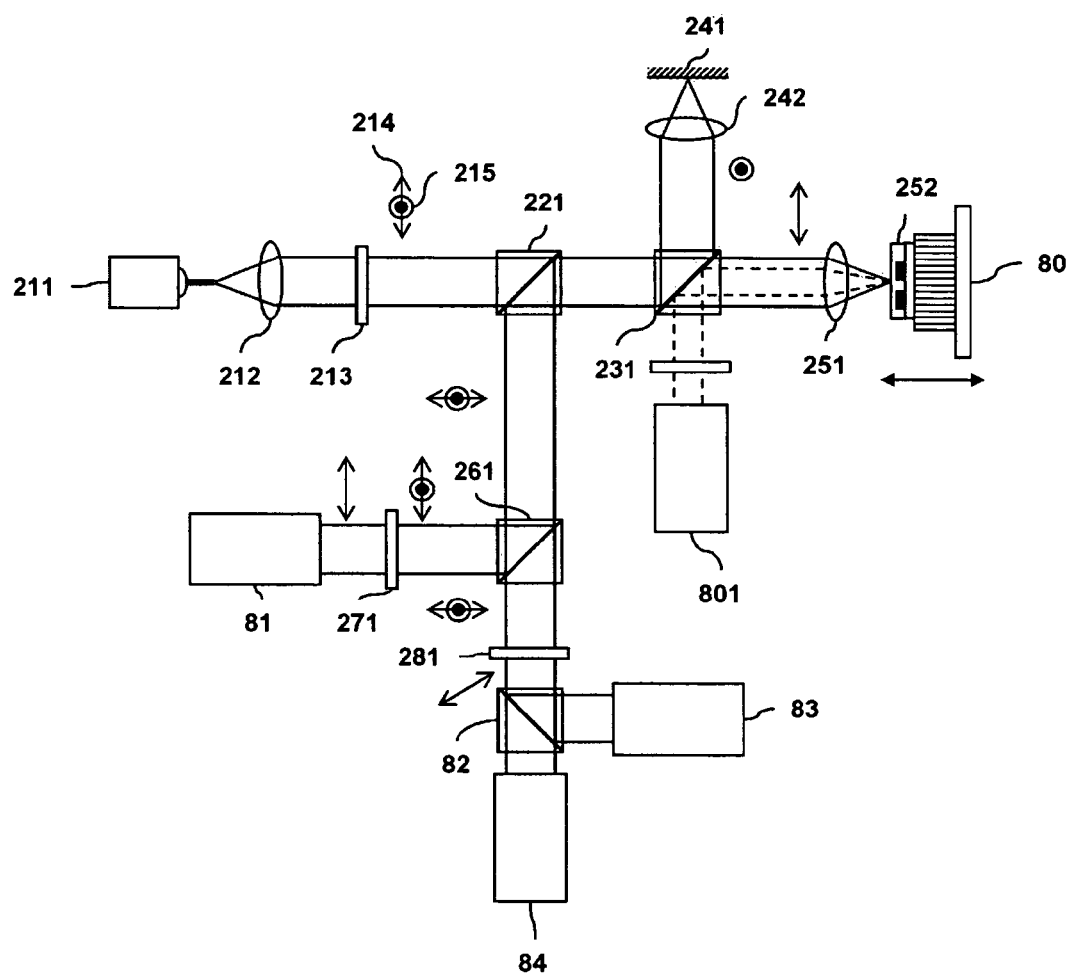
FIG. 8B is a diagram showing the construction of an apparatus for measuring the thickness and profile of a transparent thin film using a white-light interferometer according to a sixth embodiment of the present invention.

FIG. 8B is a diagram showing the construction of an apparatus for measuring the thickness and profile of a transparent thin film using a white-light interferometer according to a sixth embodiment of the present invention.

The sixth embodiment of FIG. 8B has the same construction as the above-described fifth embodiment, and performs the same functions with respect to the same components. However, there is a structural difference in that an automatic focus control device 801 is additionally provided. Such an automatic focusing control device 801 was previously filed by the present inventor (disclosed in Korean Pat. Appln. No. 10-2004-51788), and thus a detailed description thereof is omitted. The automatic focus control device 801 is additionally provided, so that, if the interferometer of the sixth embodiment is used, information about the profile of the thin film can be obtained from both existing thin film thickness information and thin film profile information, including thin film thickness information, and, in addition, an automatic focus control function can be performed.

Figure 8C:
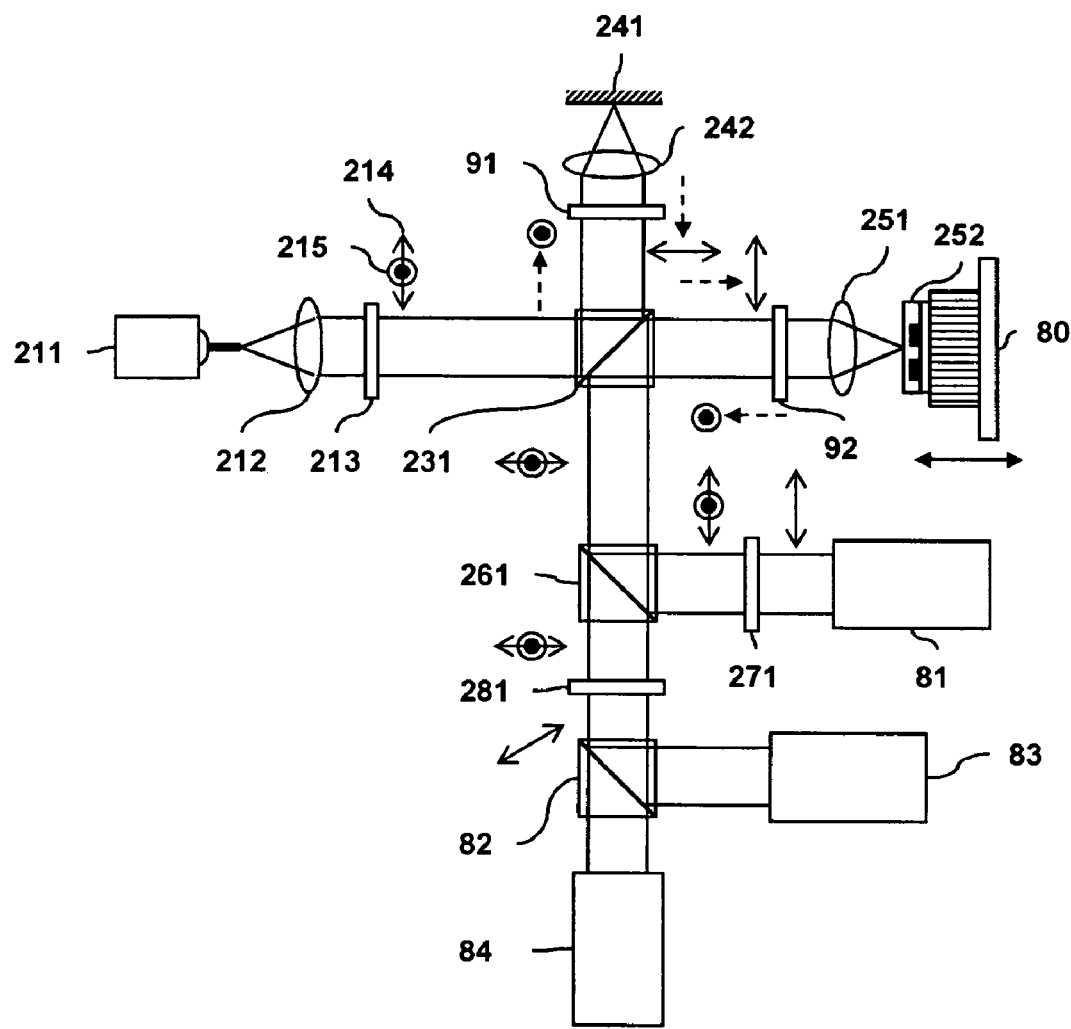
FIG. 8C is a diagram showing the construction of an apparatus for measuring the thickness and profile of a transparent thin film using a white-light interferometer according to a seventh embodiment of the present invention.

FIG. 8C is a diagram showing the construction of an apparatus for measuring the thickness and profile of a transparent thin film using a white-light interferometer according to a seventh embodiment of the present invention.

The seventh embodiment of FIG. 8C has the same construction as the fifth embodiment, and performs the same functions with respect to the same components. However, in order to further simplify construction, a beam splitter (the beam splitter 221 of FIG. 2B) is omitted. That is, coherent light from a measurement surface 252 and reflected light from a reference surface 241 are incident on a beam splitter 261 through a polarizing beam splitter 231, and are reflected from or pass through the beam splitter 261. Accordingly, the distribution of light intensity at each wavelength with respect to a single line is obtained through imaging spectroscopes 81 and 83. That is, a polarization device 213 separates polarized light into horizontally polarized light 214 and vertically polarized light 215, thereby causing the horizontally polarized light 214 and vertically polarized light 215 to be incident on the measurement surface 252 and the reference surface 241, respectively. In this case, the horizontally polarized light 214, having passed through a λ/4 plate 92, is reflected from the measurement surface 252, passes through the λ/4 plate 92 again, and is then emitted as vertically polarized coherent light. The vertically polarized light 215, having passed through a λ/4 plate 91, is reflected from the reference surface 241, passes through the λ/4 plate 91 again, and is emitted as horizontally polarized reflected light. Two light beams 214 and 215 are incident on the beam splitter 261 through the polarizing beam splitter 231. The beam splitter 261 reflects the incident light and emits the reflected light to a vertical polarization device 271 that is constructed to cause only vertically polarized light to pass therethrough so as to measure the thickness of the thin film. Further, the incident light, having passed through the beam splitter 261, is emitted to a polarizer 281 that is constructed to cause part of the horizontally polarized light and part of the vertically polarized light to pass therethrough so as to measure the profile of the thin film. The vertical polarization device 271 passes only coherent light, which is vertically polarized light, therethrough, thus obtaining the distribution of light intensity at each wavelength with respect to a single line through an imaging spectroscope 81. Meanwhile, the 45° polarizer 281 causes the coherent light, which is the vertically polarized light 215, to interfere with the reflected light, which is the horizontally polarized light 214, thus obtaining composite coherent light. The distribution of light intensity at each wavelength with respect to a single line is obtained from the composite coherent light through an imaging spectroscope 83. Therefore, information about the thickness and profile of the thin film is acquired from both the thin film thickness information, which is obtained from the coherent light, and the thin film profile information including thin film thickness information, which is obtained from the composite coherent light.

Figure 9:
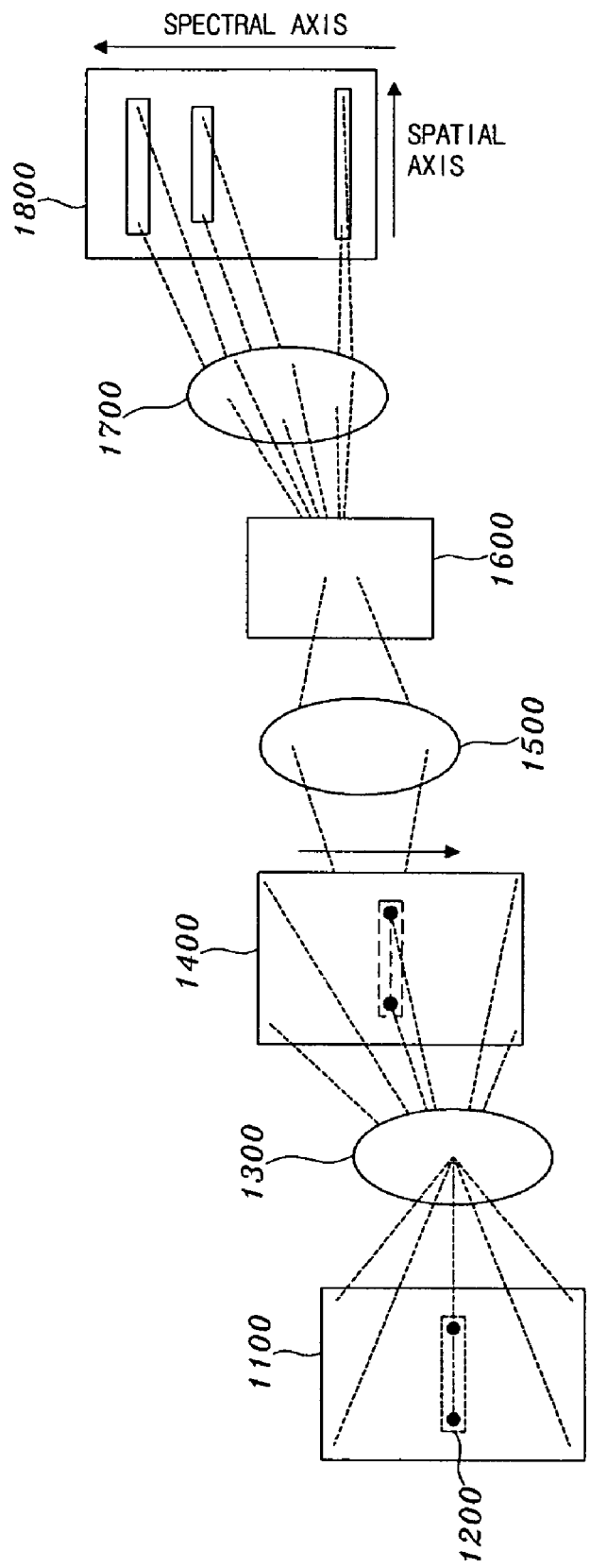
FIG. 9 is a diagram showing the detailed construction of an imaging spectroscope applied to the fifth to seventh embodiments of the present invention.

FIG. 9 is a diagram showing the detailed construction of an imaging spectroscope applied to the fifth to seventh embodiments of the present invention.

Referring to FIG. 9, the imaging spectroscope used in the fifth to seventh embodiments of the present invention is required to obtain the distribution of light intensity at each wavelength with respect to a single line within a region 1100 onto which a measurement beam is radiated. That is, a measurement line 1200 in the measurement beam radiation region 1100 is selected by vertically moving a slit 1400 based on the light having passed through a collimating lens 1300. Light penetrating through the slit 1400 corresponding to the selected measurement line 1200 is transmitted to a CCD 1800 through a collimating lens 1500, a diffuser 1600 and a condensing lens 1700, so that the distribution of light intensity at each wavelength with respect to a single line can be obtained through the CCD 1800. The distribution of light intensity is analyzed, so that thickness information and profile information can be acquired from both thickness information for a single line and profile information, including the thickness information.

Figure 10:
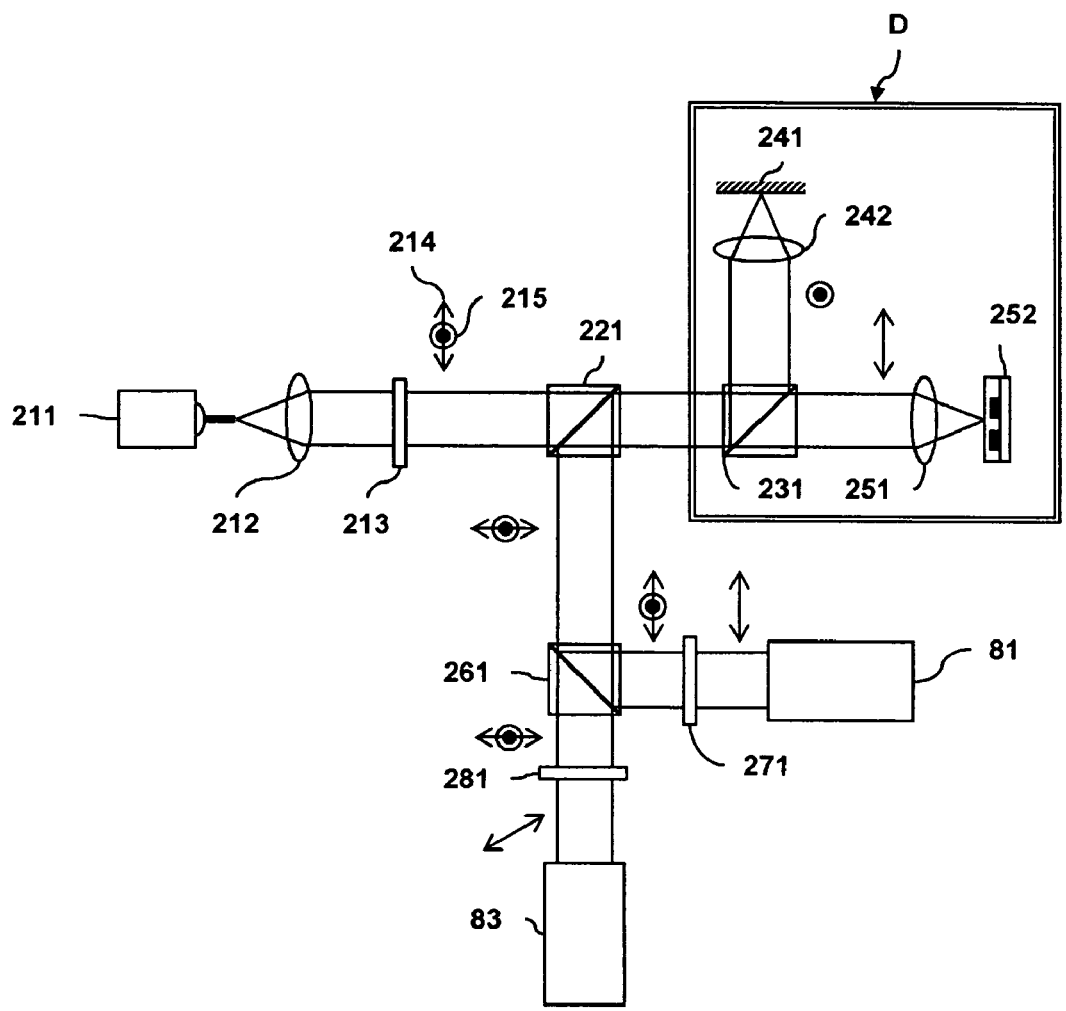
FIG. 10 is a diagram showing the construction of an apparatus for measuring the thickness and profile of a transparent thin film using a white-light interferometer according to an eighth embodiment of the present invention.

FIG. 10 is a diagram showing the construction of an apparatus for measuring the thickness and profile of a transparent thin film using a white-light interferometer according to an eighth embodiment of the present invention.

The eighth embodiment of FIG. 10 performs the same operation with respect to the same components as the fifth embodiment of FIG. 8A, so detailed descriptions thereof are omitted.

Comparing FIG. 10 to FIG. 8A, the piezoelectric actuator of FIG. 8A is omitted in a dotted line box D including a measurement surface 252. Since the piezoelectric actuator is omitted, a CCD for obtaining an interference pattern generated by the difference between optical paths is omitted, and thus the apparatus of FIG. 10 includes two imaging spectroscopes 81 and 83.

Figure 11A:
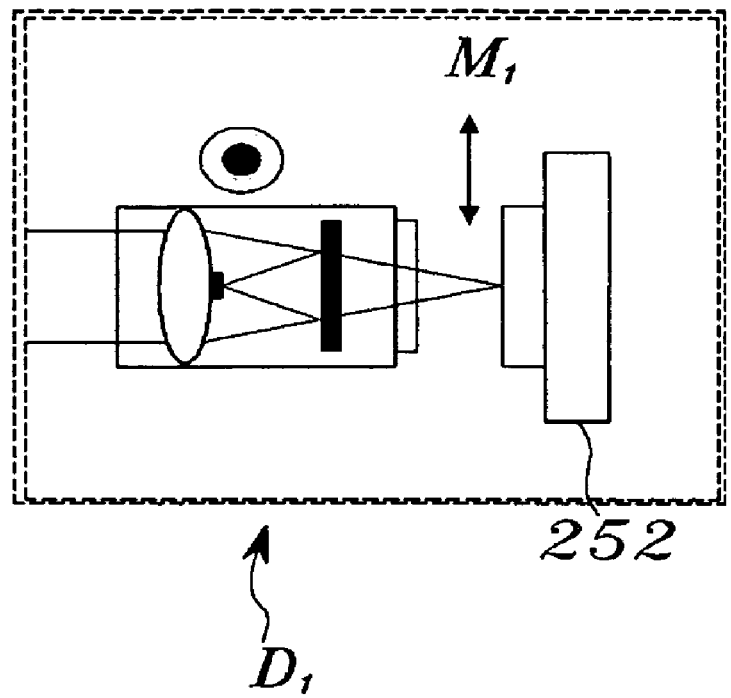
FIGS. 11A and 11B are diagrams showing modified constructions of the eighth embodiment of the present invention.
Figure 11B:
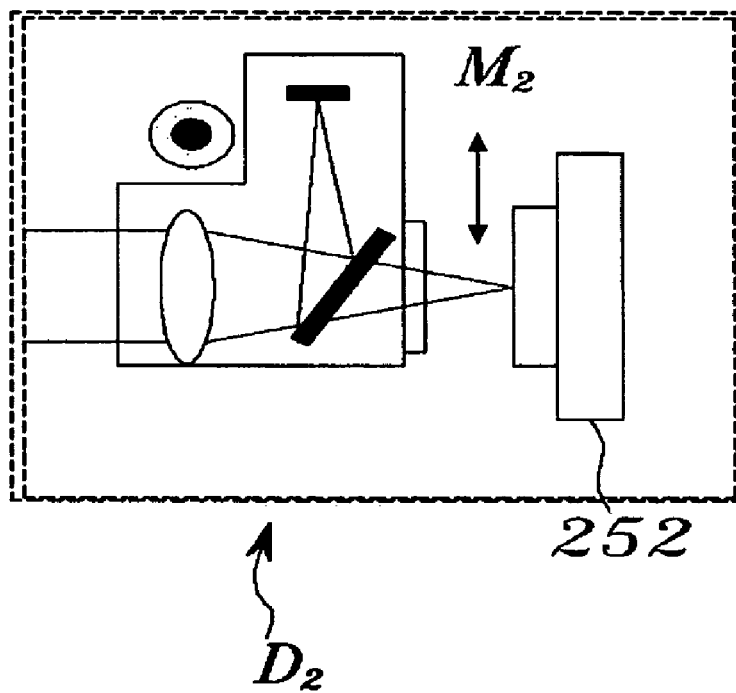

FIGS. 11A and 11B are diagrams showing modified constructions of the eighth embodiment of the present invention.

FIG. 11A illustrates a modified construction in which the dotted line box D of FIG. 10 is replaced with a dotted line box D1. In the dotted line box D1, a Mirau interference objective lens system M1 is provided.

FIG. 11B illustrates a modified construction in which the dotted line box D of FIG. 10 is replaced with a dotted line box D2. In the dotted line box D2, a Michelson interference objective lens system M2 is provided.

Each of the objective lens systems M1 and M2 is constructed to include a reference surface and a polarized beam splitter. These components are well known to those skilled in the art so detailed descriptions thereof are omitted.

Further, in the above embodiments, the distribution of light intensity at each wavelength with respect to a point or line is obtained. However, it is also possible to include a spectroscope capable of imaging a region at each wavelength, such as an Acousto-Optic Tunable Filter (AOTF) or a Liquid Crystal Tunable Filter (LCTF) for obtaining the distribution of light intensity at each wavelength with respect to a single area from coherent light and composite coherent light, thus analyzing the distribution of light intensity at each wavelength with respect to an area obtained by the image spectroscope, and acquiring information about the thickness and the profile of a thin film.

As described above, the present invention is advantageous in that it can process a measurement region with respect to a single point or a single line through real-time measurement and a single measurement without requiring a separate driving device, and is resistant to external vibration. Further, the present invention is advantageous in that it can independently extract information about the thickness and profile of a single layer thin film using a blocking surface of a Michelson interferometer module, or the polarization of light, and, in addition, can maintain high measurement resolution.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of measuring a thickness and a profile of a transparent thin film, the method acquiring information about a thickness and a profile of a thin film of a measurement object coated with the thin film, comprising:

a first step of converting white light into light polarized in an arbitrary direction, and separating the polarized light into horizontally polarized light and vertically polarized light;

a second step of causing one of the horizontally polarized light and the vertically polarized light to be incident on the measurement object coated with the thin film, and causing a remaining one of the vertically polarized light and the horizontally polarized light to be incident on a reference surface;

a third step of generating coherent light while the light incident on the measurement object is reflected from an upper surface and a lower surface of the thin film and reflected light beams interfere with each other;

a fourth step of reflecting the light incident on the reference surface to obtain reflected light, and combining the reflected light with the coherent light at the third step to generate composite coherent light;

a fifth step of separating the coherent light at the third step according to frequency, and obtaining an interference pattern at each frequency;

a sixth step of separating the composite coherent light at the fourth step according to frequency, and obtaining an interference pattern at each frequency;

a seventh step of obtaining a phase generated by thickness of the thin film through the interference pattern at each frequency at the fifth step, and acquiring only information about a thickness of the thin film from the phase;

an eighth step for obtaining a phase from the interference pattern at each frequency at the sixth step, and acquiring information about a profile of the thin film including information about a thickness of the thin film; and a ninth step of acquiring only information about the profile of the thin film from the thin film profile information including the thin film thickness information, which is acquired at the eighth step, using the thin film thickness information, which is acquired at the seventh step.

2. The thickness and profile measurement method according to claim 1, wherein the obtainment of a phase from the interference pattern comprises the steps of:

modeling the interference pattern using an equation;

performing high pass filtering to eliminate low frequency components contained in the interference pattern;

eliminating an envelope component from the interference pattern, from which the low frequency components have been eliminated, and arranging envelope elimination results as a cosine function including a phase value that contains information about the thickness and profile of the thin film;

performing a Fast Fourier Transform (FFT) on the arranged cosine function, taking only a positive frequency component of FFT results, and performing an Inverse FFT (IFFT) on the positive frequency component;

taking a natural logarithm of IFFT results, converting natural logarithm results to cause an imaginary number part thereof to be a phase value, and obtaining the phase value; and acquiring the thickness and the profile of the thin film from a slope of the phase value according to frequency and a refractive index N of the thin film.

3. An apparatus for measuring a thickness and a profile of a transparent thin film, comprising:

a light source for emitting white light;

a polarization device for polarizing the white light in an arbitrary direction to generate polarized light; and a polarizing beam splitter for splitting the polarized light into horizontally polarized light and vertically polarized light, wherein the apparatus is operated in such a way as to cause the horizontally polarized light to be incident on a measurement object coated with a thin film and to be reflected from an upper surface and a lower surface of the thin film, obtain coherent light using reflected light beams, cause the vertically polarized light to be incident on and reflected from a reference surface to obtain reflected light, obtain a phase of the coherent light, acquire information about a thickness of the thin film from the phase, obtain a phase from composite coherent light obtained by causing the coherent light to interfere with the reflected light, acquire information about a profile of the thin film including information about a thickness of the thin film, from the phase of the composite coherent light, and acquire information about the thickness and profile of the thin film, from the thin film thickness information, which is acquired from the coherent light, and the thin film profile information including the thin film thickness information, which is acquired from the composite coherent light, and further comprising:

a polarization plate for only obtaining coherent light to obtain a phase from the coherent light;

a first diffraction grating for separating the coherent light according to frequency and obtaining separated light beams so as to obtain a phase from the coherent light;

a first image acquisition unit for acquiring the separated light beams, wherein image processing and algorithms are applied to the separated light beams to obtain the phase;

a 45° polarization plate for obtaining composite coherent light to obtain a phase from the composite coherent light;

a second diffraction grating for separating the composite coherent light according to frequency and obtaining separated light beams; and a second image acquisition unit for acquiring the separated light beams, wherein the apparatus is operated in such a way as to obtain the phase by applying the image processing and algorithms to the separated light beams, which are obtained from the composite coherent light, thus acquiring information about the thickness and profile of the thin film.

4. An apparatus for measuring a thickness and a profile of a transparent thin film, comprising:

a light source for emitting white light;

a polarization device for polarizing the white light in an arbitrary direction to generate polarized light;

a polarizing beam splitter for splitting the polarized light into horizontally polarized light and vertically polarized light, wherein the horizontally polarized light is incident on a measurement object coated with a thin film and is reflected from an upper surface and a lower surface of the thin film to obtain coherent light using reflected light beams, and the vertically polarized light is incident on and reflected from a reference surface to obtain reflected light;

a polarization plate for only obtaining coherent light by selecting the coherent light from the composite coherent light to obtain a phase from the coherent light;

a first diffraction grating for separating the coherent light according to frequency and obtaining separated light beams so as to obtain a phase of the coherent light;

a first image acquisition unit for acquiring the separated light beams, wherein image processing and algorithms are applied to the separated light beams to obtain a phase, and then only information about a thickness of the thin film is acquired from the phase;

a 45° polarization plate for obtaining composite coherent light by causing the coherent light to interfere with the reflected light, so as to obtain a phase from the composite coherent light;

a second diffraction grating for separating the composite coherent light according to frequency and obtaining separated light beams; and a second image acquisition unit for acquiring the separated light beams, wherein the apparatus is operated in such a way as to obtain the phase by applying the image processing and algorithms to the separated light beams obtained from the composite coherent light, acquire information about a profile of the thin film including information about a thickness of the thin film, from the phase of the composite coherent light, and acquire information about the thickness and profile of the thin film from the thin film thickness information, which is acquired from the coherent light, and the thin film profile information including the thin film thickness information, which is acquired from the composite coherent light.

5. The thickness and profile measurement apparatus according to claim 4, wherein a cylindrical lens is used to obtain the coherent light, the reflected light and the composite coherent light in a line shape, and a cylindrical lens is used to obtain an interference pattern at each frequency from the line-shaped coherent light and the line-shaped composite coherent light, thus acquiring the information about the thickness and profile of the thin film.

* * * * *